(12) United States Patent
Habashy et al.

(10) Patent No.: US 8,744,817 B2
(45) Date of Patent: *Jun. 3, 2014

(54) METHOD FOR UPSCALING A RESERVOIR MODEL USING DEEP READING MEASUREMENTS

(75) Inventors: Tarek Habashy, Burlington, MA (US); Jeff Spath, Missouri City, TX (US); Raj Banerjee, Abingdon (GB); Michael Thambynayagam, Sugarland, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 854 days.

This patent is subject to a terminal disclaimer.

(21) Appl. No.: 12/152,533

(22) Filed: May 15, 2008

(65) Prior Publication Data

US 2009/0164188 A1 Jun. 25, 2009

Related U.S. Application Data

(63) Continuation-in-part of application No. 12/004,792, filed on Dec. 21, 2007.

(51) Int. Cl.
*G06G 7/48* (2006.01)
(52) U.S. Cl.
USPC ................................................ 703/6; 703/10
(58) Field of Classification Search
USPC ...................................................... 703/6, 10
See application file for complete search history.

(56) References Cited

U.S. PATENT DOCUMENTS

| | | | |
|---|---|---|---|
| 5,672,819 A * | 9/1997 | Chin et al. ................. | 73/152.41 |
| 5,764,515 A | 6/1998 | Guerillot et al. | |
| 6,061,634 A | 5/2000 | Belani et al. | |
| 6,166,994 A * | 12/2000 | Jeffryes .......................... | 367/57 |
| 6,182,012 B1 * | 1/2001 | Laurent et al. .................... | 702/6 |
| 6,236,943 B1 | 5/2001 | Aminzadeh et al. | |
| 6,388,947 B1 | 5/2002 | Washbourne et al. | |
| 6,393,363 B1 * | 5/2002 | Wilt et al. ......................... | 702/6 |
| 6,427,124 B1 | 7/2002 | Dubinsky et al. | |
| 6,662,109 B2 | 12/2003 | Roggero et al. | |
| 6,670,813 B2 | 12/2003 | Strack | |
| 6,712,140 B2 * | 3/2004 | van Oers et al. ......... | 166/250.16 |
| 6,778,918 B2 * | 8/2004 | Delhomme et al. ............ | 702/50 |
| 6,899,178 B2 * | 5/2005 | Tubel ............................ | 166/313 |
| 6,922,373 B2 * | 7/2005 | Armstrong ...................... | 367/73 |
| 6,980,940 B1 | 12/2005 | Gurpinar et al. | |
| 7,030,617 B2 * | 4/2006 | Conti ............................ | 324/339 |
| 7,069,148 B2 | 6/2006 | Thambynayagam et al. | |

(Continued)

FOREIGN PATENT DOCUMENTS

GB 2474150 4/2011
WO 2009140056 A1 11/2009

OTHER PUBLICATIONS

Z.L. Liu et al., "An iterative inversion of seismic data constrained by wells using artificial neural networks", 1998, Offshore Technology Conference, pp. 341-348.*
T.B. Berge et al., "Seismic inversion successfully predicts reservoir, porosity, and gas content in Ibhubesi Field, Orange Basin, South Africa", 2002, The Leading Edge, 338, 340, 342, 344, 346, 348.*
Rick Lindsay et al. "Sequential Backus Averaging: Upscaling well logs to seismic wavelengths", 2001, The Leading Edge, pp. 188-191.*

(Continued)

*Primary Examiner* — Dwin M Craig
*Assistant Examiner* — Russ Guill

(57) ABSTRACT

A method of upscaling for reservoir simulation is disclosed, comprising: inverting a set of deep reading measurements constrained by upscaled multi-well data, and, in response to the inverting step, upscaling for reservoir simulation.

48 Claims, 15 Drawing Sheets

(56) References Cited

U.S. PATENT DOCUMENTS

| | | | |
|---|---|---|---|
| 7,187,620 B2 * | 3/2007 | Nutt et al. | 367/25 |
| 7,191,071 B2 | 3/2007 | Kfoury et al. | |
| RE39,844 E | 9/2007 | Smka | |
| 7,340,348 B2 * | 3/2008 | Strack et al. | 702/14 |
| RE40,321 E | 5/2008 | Smka | |
| 7,502,690 B2 | 3/2009 | Thomsen et al. | |
| 7,805,250 B2 | 9/2010 | Colombo et al. | |
| 2005/0116709 A1 * | 6/2005 | Proett et al. | 324/303 |
| 2007/0294036 A1 | 12/2007 | Strack et al. | |
| 2008/0059075 A1 * | 3/2008 | Colombo et al. | 702/18 |
| 2008/0162050 A1 * | 7/2008 | Harris et al. | 702/11 |
| 2009/0164187 A1 | 6/2009 | Habashy et al. | |
| 2009/0164188 A1 | 6/2009 | Habashy et al. | |
| 2010/0027376 A1 * | 2/2010 | Washbourne et al. | 367/25 |

OTHER PUBLICATIONS

Ran Bachrach et al., "Combining rock physics analysis, full waveform prestack inversion and high-resolution seismic interpretation to map litholgy units in deep water: a Gulf of Mexico case study", Apr. 2004, The Leading Edge, pp. 378-383.*

Kevin Jarvis "Integrating well and seismic data for reservoir characterization: risks and rewards", 2006, AESC Association of Energy Service Companies, pp. 1-4.*

John Pendrel, "Seismic inversion—the best tool for reservoir characterization", 2001, CSEG Canadian Society of Exploration Geophysics Recorder, vol. 26, No. 1, seven unnumbered pages.*

G. Russell Young, "Model-based inversion of multiple offset data for elastic parameter estimation", 2006, Exploration Geophysics Symposium, 28 pages.*

M.A. Christie, "Upscaling for reservoir simulation", 1996, Journal of Petroleum Technology, pp. 1004-1010.*

Heyong Wu et al., "Combined seismic inversion methods in reservoir model development", Nov. 11, 2007, paper SPE 109626, 2007 Society of Petroleum Engineers Annual Technical Conference and Exhibition, pp. 1-8.*

Arturo Contreras et al., "Joint stochastic inversion of 3D pre-stack seismic data and well logs for high-resolution reservoir characterization and petrophysical modeling: application to deepwater hydrocarbon reservoirs in the central Gulf of Mexico", 2005, SPWLA Society of Petrophysicists and Well Log Analysts 46th Annual Logging Symposium, four.*

"Topic Paper #19 Conventional Oil and Gas (Including Arctic and Enhanced Oil Recovery)," Jul. 18, 2007, National Petroleum Council, pp. 1-29.*

John Pendrel, "Seismic Inversion-A Critical Tool in reservoir Characterization," 2006, Scandanavian Oil-Gas Magazine, No. 5/6, pp. 19-22.*

S.B. Reymond et al., "Mapping reservoir saturation with seismic resolution to improve reservoir model," 1999, Society of Petroleum Engineers, SPE 57259, four pages.*

Haber, E., and D. Oldenburg, "Joint inversion: A structural approach", Inverse Problems, 1997, pp. 63-77, vol. 13, No. 1, UK.

Musil, M., H.R. Maurer, and Green, A., "Discrete tomography and joint inversion for loosely connected or unconnected physical properties: application to crosshole seismic and georadar data sets", Geophysical journal international, 2003, pp. 389-402, No. 2.

Gallardo, L. A., and M. A. Meju, "Characterization of heterogeneous near-surface materials by joint 2D inversion of dc resistivity and seismic data", Geophysical Research Letters, 2003, pp. 1-4, vol. 30, No. 13.

Gallardo, L. A., and M. A. Meju, "Joint two-dimensional DC resistivity and seismic travel time inversion with cross gradient constraints", Journal of Geophysical Research, 2004, pp. 1-11, vol. 109.

Gallardo, L. A., and M. A. Meju, "Joint two-dimensional cross-gradient imaging of magnetotelluric and seismic traveltime data for structural and lithological classification", Geophys. J. Int., 2007, pp. 1261-1272, vol. 169 Issue 3.

Colombo, D and Destefano, M, "Geophysical modeling via simultaneous joint inversion of seismic, gravity, and electromagnetic data: Application to prestack depth imaging", The Leading Edge, Mar. 2007, pp. 326-331.

Colombo, D et. al., "Simultaneous joint inversion of seismic and gravity data for long offset prestack depth migration in Northern Oman", CSPG CSEG Convention, 2007, pp. 191-195.

Hu, W, Abubakar, A. and Habashy, T, "Joint Inversion Algorithm for Electromagnetic and Seismic Data". Extended Abstract of the 2007 SEG Annual Meeting, Sep. 23-28, 2007,pp. 1745-1749, San Antonio, TX, USA.

Smith, T., Hoversten, M., Gasperikova, E., and Morrison, F., "Sharp boundary inversion of 2D magnetotelluric data," Geophysical Prospecting, 1999, pp. 469-486, vol. 47.

Hoversten, M., Rosten, T., Hokstad, K., Alumbaugh, D., Horne, S., and Newman, G., "Integration of multiple electromagnetic imaging and inversion techniques for prospect evaluation," 2006 SEG Annual Meeting, Oct. 1-6, 2006, pp. 1-4, New Orleans, Louisiana, USA.

Hoversten, G. M., Constable, S.C. and Morrison H.F., "Marine magnetotellurics for base-of-salt mapping: Gulf of Mexico field test at the Gemini structure", Geophysics, Sep.-Oct. 2000, pp. 1476-1488, vol. 65, No. 5.

Zhang, Y., Abubakar, A., Habashy, T., Druskin, V. and Knizhnerman, L., "Parametric inversion algorithm for marine controlled source electromagnetic data", Extended Abstract of 2007 SEG Annual Meeting, Sep. 23-28, 2007, pp. 569-573, San Antonio, TX, USA.

Hoversten, M,G., Gritto, R., Washbourne, J. and Daley, T., "Pressure and fluid saturation prediction in a multicomponent reservoir using combined seismic and electromagnefic imaging", Geophysics, Sep.-Oct. 2003, pp. 1580-1591, vol. 68, No. 5.

Alpak, O.F., Torres-Verdin, C. and Habashy, T., "Joint inversion of Transient pressure and DC resistivity measurements acquired with in-situ permanent sensors: a numerical study," Geophysics, Sep.-Oct. 2004, pp. 1173-1191, vol. 69, No. 5.

Alpak, O.F., Torres-Verdin, C., Habashy, T. and Dussan, E.V., "Joint Inversion of Transient-Pressure and Time-Lapse Electromagnetic Logging Measurements," Petrophysics, May-Jun. 2004, pp. 251-267, vol. 45, No. 3.

Alpak, O.F., Torres-Verdin, C. and Habashy, T., "Petrophysical inversion of borehole array-induction logs: Part I—Numerical examples,"Geophysics, Jul.-Aug. 2006, pp. F101-F119, vol. 71, No. 4.

Torres-Verdin, C., Alpak, O.F. and Habashy, T., "Petrophysical inversion of borehole array-induction logs: Part II—Field data examples," Geophysics, Jul.-Aug. 2006, pp. G261-G268, vol. 71, No. 4.

Hoversten, G. M., et al., "Direct reservoir parameter estimation using joint inversion of marine seismic AVA and CSEM data",Geophysics, May-Jun. 2006, pp. C1-C13. vol. 71, No. 3.

Hou, Z. et al., "Reservoir-parameter identification using minimum relative entropy-based Bayesian inversion of seismic AVA and marine CSEM data", Geophysics, Nov.-Dec. 2006, pp. O77-O88, vol. 71, No. 6.

Chen, J. et al., "A Bayesian model for gas saturation estimation using marine seismic AVA and CSEM data", Geophysics, Mar.-Apr. 2007, pp. WA85-WA95, vol. 72, No. 2.

Harris, P. and MacGregor, L., "Determination of reservoir properties from the integration of CSEM, seismic, and well-log data", First Break, Nov. 2006, pp. 15-21, vol. 24.

International Search Report of PCT Application Serial No. PCT/US08/85499 dated Jan. 29, 2009.

International Search Report of PCT Application Serial No. PCT/US2009/041935 dated Jun. 24, 2009.

Partyka, et al., "Upscaling petrophysical properties to the seismic scale", downloaded from the Wayback Machine, http://www.freeusp.org/RaceCarWebsite/TechTransfer/OnlineTraining/BackusUpscaling/BackusUpscaling_Index.html, Mar. 2005, 4 pages.

Sengupta, et al., "Uncertainty in seismic-based pay volume estimation: analysis using rock physics and Bayesian statistics", The Leading Edge, Feb. 2007, pp. 184-189.

* cited by examiner

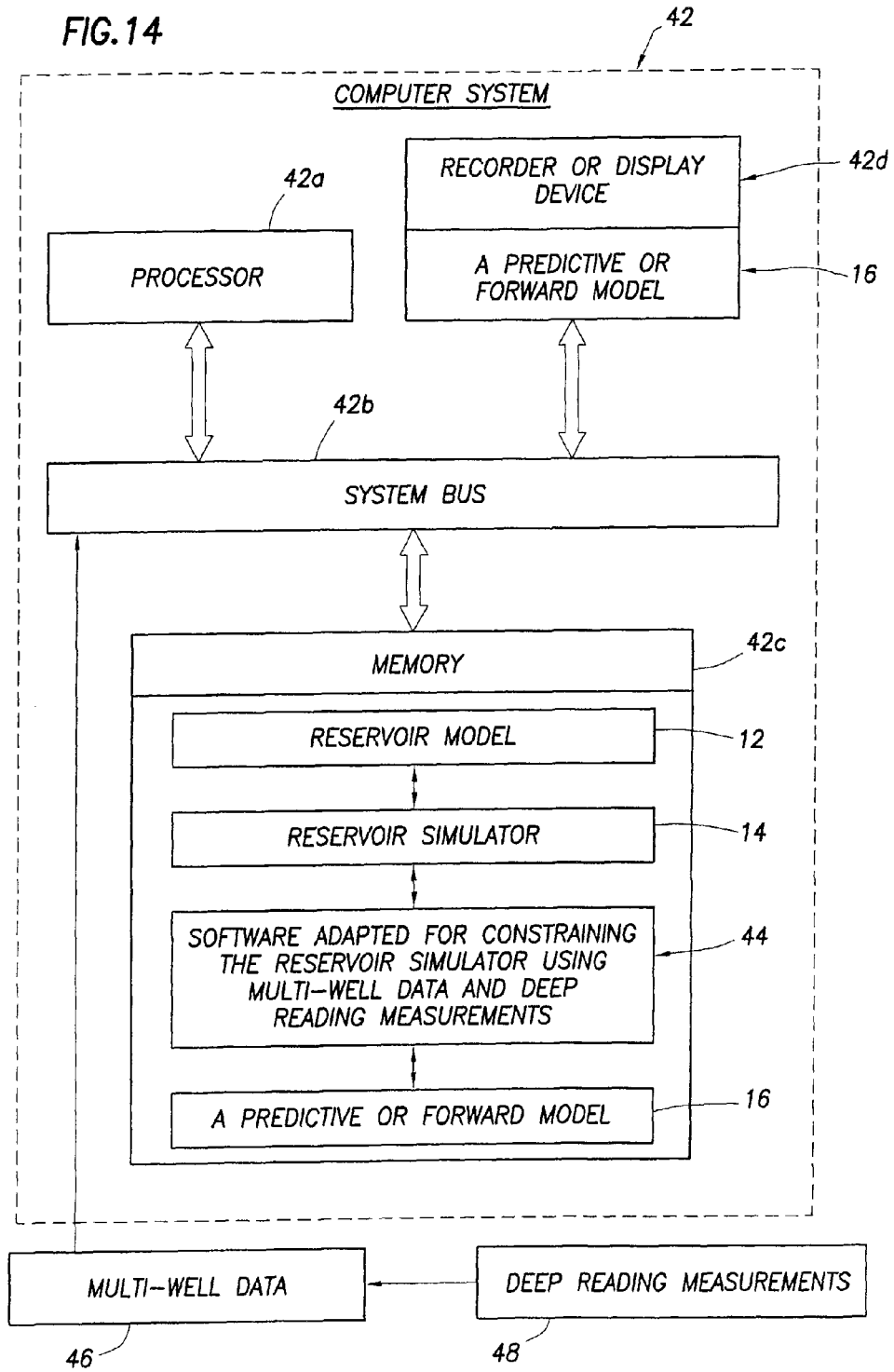

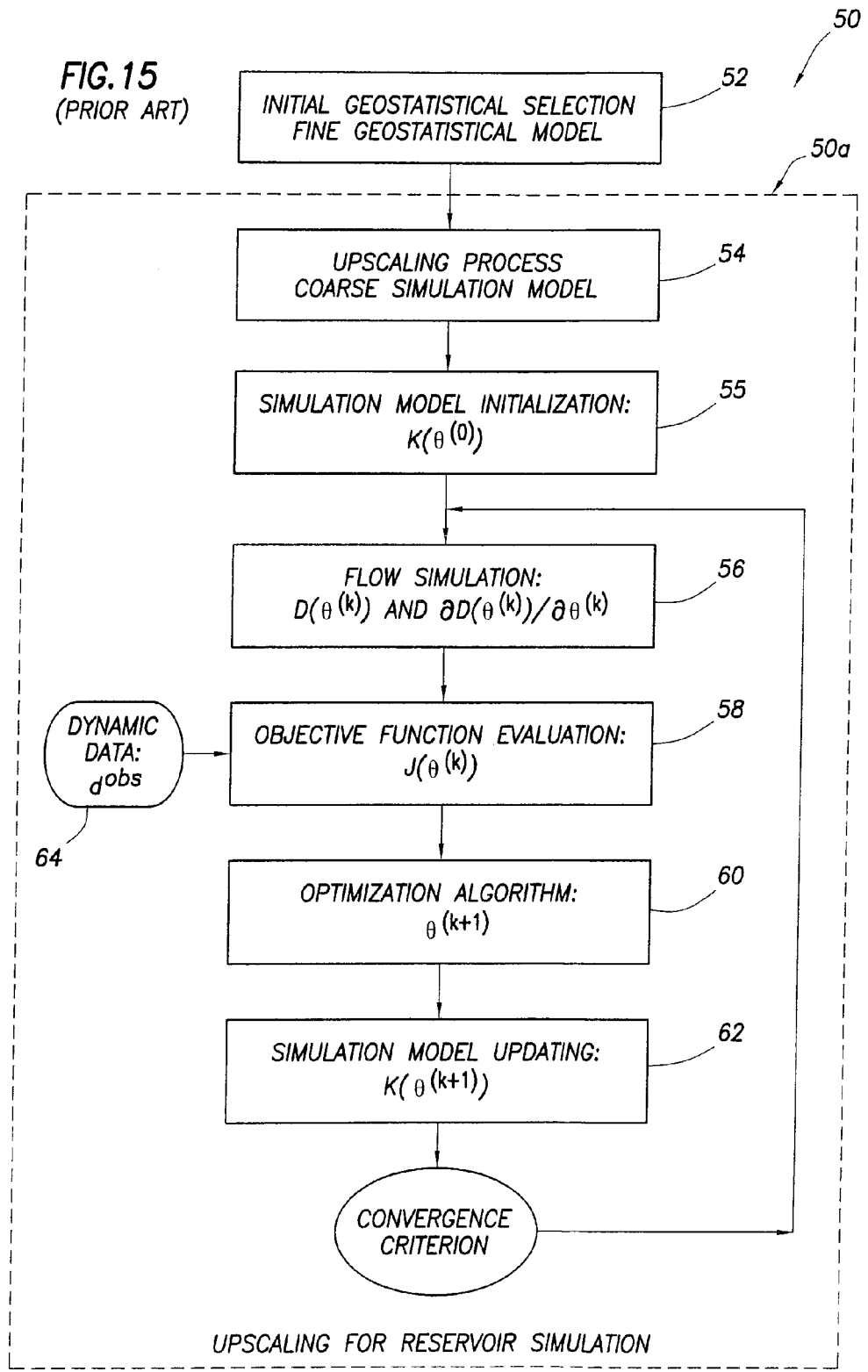

DEEP READING MEASUREMENTS

COMBINATION OF:

- LONG-OFFSET SINGLE-WELL MEASUREMENTS (i.e., EM, SONIC/SEISMIC, GRAVITY)
- CROSS-WELL (EM AND SEISMIC)
- SURFACE EM: MAGNETOTULLURICS (MT), CONTROLLED-SOURCE (CSEM) SPONTANEOUS POTENTIAL (SP), MULTI-CHANNEL TRANSIENT EM (MTEM)
- SURFACE GRAVITY
- SURFACE TO BOREHOLE (EM AND SEISMIC)
- OFFSET/WALKAWAY/WALKAROUND VSP
- TRANSIENT PRESSURE AND MULTI-WELL INTERFERENCE TESTING
- ELECTROKINETICS: ELECTRO-SEISMIC AND SEISMO-ELECTRIC
- PERMANENT MONITORING (EM, PRESSURE, SEISMIC)
- BOREHOLE RADAR AND SONAR

FIG.20

METHOD FOR UPSCALING A RESERVOIR MODEL USING DEEP READING MEASUREMENTS

CROSS REFERENCE TO RELATED APPLICATIONS

This application is a Continuation-in-Part of prior application Ser. No. 12/004,792, filed Dec. 21, 2007, and entitled "Method for Reservoir Characterization and Monitoring including Deep Reading Quad Combo Measurements".

BACKGROUND

The subject matter set forth in this specification relates to a software adapted to be stored in a memory of a computer system which, when executed, will perform reservoir upscaling using a set of 'Deep Reading Measurements'.

The current practice in reservoir characterization is to use 'near-wellbore logs' (such as wireline logs or logs generating when Logging While Drilling) and, together with petrophysical models, to estimate the static (and some dynamic) properties of the reservoir (e.g., porosity, saturation, mineralogy, etc.). These logs determine these properties (up to a radial depth of 10 ft or so away from the well) on a scale determined by their resolution, which can vary anywhere from few inches to few feet. However, not all such features will have an impact on a reservoir model that is on the scale of a flow unit, which is usually on the order of 10's if not 100's of meters corresponding to the size of an 'Eclipse' flow grid (the term 'Eclipse' refers to a product which is owned and operated by Schlumberger Technology Corporation). The issue, therefore, is 'how to perform the upscaling'. Presently, 'geostatistics' is used to both 'average the near-wellbore data at a coarser scale' and then 'interpolate these data between wells'. This 'geostatistical approach' assumes that little variation occurs in the reservoir away from wells where data are available, and this can result in a poor estimate.

This specification discloses the use of 'deep reading measurements' to perform this 'upscaling process'.

A U.S. Pat. No. 6,662,109 B2 to Roggero et al was issued on Dec. 9, 2003 (hereinafter, the 'Roggero patent'), corresponding to U.S. Patent Application Publication 2003/0028325 A1 published on Feb. 6, 2003, and is entitled "Method of Constraining By Dynamic Production Data a Fine Model Representative of the Distribution in the Reservoir of a Physical Quantity Characteristic of the Subsoil Structure", the disclosure of which is incorporated by reference into the specification of this application.

U.S. Pat. No. 5,764,515 to Guerillot et al, issued Jun. 9, 1998 (hereinafter, the 'Guerillot patent'), is entitled "Method for Predicting, by Means of an Inversion Technique, the Evolution of the Production of an Underground Reservoir", the disclosure of which is incorporated by reference into the specification of this application.

SUMMARY

One aspect of the present invention involves a method of upscaling for reservoir simulation, comprising: inverting a set of deep reading measurements constrained by upscaled multi-well data, and, in response to the inverting step, upscaling for reservoir simulation.

Another aspect of the present invention involves a program storage device readable by a machine tangibly embodying a set of instructions executable by the machine to perform method steps of upscaling for reservoir simulation, the method steps comprising: inverting a set of deep reading measurements constrained by upscaled multi-well data, and, in response to the inverting step, upscaling for reservoir simulation.

Another aspect of the present invention involves a computer program adapted to be executed by a processor, the computer program, when executed by the processor, conducting a process of upscaling for reservoir simulation, the process comprising: inverting a set of deep reading measurements constrained by upscaled multi-well data, and, in response to the inverting step, upscaling for reservoir simulation.

Another aspect of the present invention involves a system adapted for upscaling for reservoir simulation, comprising: first apparatus adapted for inverting a set of deep reading measurements constrained by upscaled multi-well data, and, in response to the first apparatus, second apparatus adapted for upscaling for reservoir simulation.

Another aspect of the present invention involves a method for upscaling a reservoir model, comprising: (a) integrating together a plurality of measurements thereby generating a set of deep reading measurements, the set of deep reading measurements being sufficiently deep to be able to probe the reservoir; (b) generating a set of upscaled multi-well data; (c) in response to the integrating step (a) and the generating step (b), generating a set of the deep reading measurements constrained by the upscaled multi-well data; (d) inverting the set of deep reading measurements constrained by the upscaled multi-well data thereby generating a set of inverted deep reading measurements constrained by the upscaled multi-well data; and (e) upscaling the set of inverted deep reading measurements constrained by the upscaled multi-well data.

Another aspect of the present invention involves program storage device readable by a machine tangibly embodying a set of instructions executable by the machine to perform method steps for upscaling a reservoir model, the method steps comprising: (a) integrating together a plurality of measurements thereby generating a set of deep reading measurements, the set of deep reading measurements being sufficiently deep to be able to probe the reservoir; (b) generating a set of upscaled multi-well data; (c) in response to the integrating step (a) and the generating step (b), generating a set of the deep reading measurements constrained by the upscaled multi-well data; (d) inverting the set of deep reading measurements constrained by the upscaled multi-well data thereby generating a set of inverted deep reading measurements constrained by the upscaled multi-well data; and (e) upscaling the set of inverted deep reading measurements constrained by the upscaled multi-well data.

Another aspect of the present invention involves a method for upscaling a reservoir model, comprising: (a) integrating together a plurality of measurements thereby generating a set of deep reading measurements, the set of deep reading measurements being sufficiently deep to be able to probe the reservoir; (b) generating a set of upscaled multi-well data; (c) generating an initial model which includes a geostatistics step; (d) in response to the integrating step (a) and the generating step (b) and the generating step (c), generating a set of the deep reading measurements constrained by the upscaled multi-well data and the initial model; (e) inverting the set of deep reading measurements constrained by the upscaled multi-well data and the initial model thereby generating a set of inverted deep reading measurements constrained by the upscaled multi-well data and the initial model; and (f) upscaling the set of inverted deep reading measurements constrained by the upscaled multi-well data and the initial model.

Another aspect of the present invention involves a program storage device readable by a machine tangibly embodying a set of instructions executable by the machine to perform method steps for upscaling a reservoir model, the method steps comprising: (a) integrating together a plurality of measurements thereby generating a set of deep reading measurements, the set of deep reading measurements being sufficiently deep to be able to probe the reservoir; (b) generating a set of upscaled multi-well data; (c) generating an initial model which includes a geostatistics step; (d) in response to the integrating step (a) and the generating step (b) and the generating step (c), generating a set of the deep reading measurements constrained by the upscaled multi-well data and the initial model; (e) inverting the set of deep reading measurements constrained by the upscaled multi-well data and the initial model thereby generating a set of inverted deep reading measurements constrained by the upscaled multi-well data and the initial model; and (f) upscaling the set of inverted deep reading measurements constrained by the upscaled multi-well data and the initial model.

Another aspect of the present invention involves a computer program adapted to be executed by a processor, the computer program, when executed by the processor, conducting a process for upscaling a reservoir model, the process comprising: (a) integrating together a plurality of measurements thereby generating a set of deep reading measurements, the set of deep reading measurements being sufficiently deep to be able to probe the reservoir; (b) generating a set of upscaled multi-well data; (c) in response to the integrating step (a) and the generating step (b), generating a set of the deep reading measurements constrained by the upscaled multi-well data; (d) inverting the set of deep reading measurements constrained by the upscaled multi-well data thereby generating a set of inverted deep reading measurements constrained by the upscaled multi-well data; and (e) upscaling the set of inverted deep reading measurements constrained by the upscaled multi-well data.

Another aspect of the present invention involves a system adapted for upscaling a reservoir model, comprising: first apparatus adapted for integrating together a plurality of measurements thereby generating a set of deep reading measurements, the set of deep reading measurements being sufficiently deep to be able to probe the reservoir; second apparatus adapted for generating a set of upscaled multi-well data; third apparatus responsive to the set of deep reading measurements from the first apparatus and to the set of upscaled multi-well data from the second apparatus for generating a set of the deep reading measurements constrained by the upscaled multi-well data; fourth apparatus adapted for inverting the set of deep reading measurements constrained by the upscaled multi-well data thereby generating a set of inverted deep reading measurements constrained by the upscaled multi-well data; and fifth apparatus adapteds for upscaling the set of inverted deep reading measurements constrained by the upscaled multi-well data.

Further scope of applicability will become apparent from the detailed description presented hereinafter. It should be understood, however, that the detailed description and the specific examples set forth below are given by way of illustration only, since various changes and modifications within the spirit and scope of the 'Method for Upscaling a Reservoir Model using Deep Reading Measurements', as described and claimed in this specification, will become obvious to one skilled in the art from a reading of the following detailed description.

BRIEF DESCRIPTION OF THE DRAWINGS

A full understanding will be obtained from the detailed description presented hereinbelow, and the accompanying drawings which are given by way of illustration only and are not intended to be limitative to any extent, and wherein:

FIGS. 1 through 13 illustrate a "Method for Reservoir Characterization and Monitoring including Deep Reading Quad Combo Measurements", wherein:

FIG. 1 illustrates a method responsive to a set of deep reading measurements for generating a predictive or forward reservoir model that can accurately predict the performance of a reservoir;

FIG. 2 illustrates the function of the predictive of forward model of FIG. 1 as including the accurate prediction of the future evolution of the reservoir;

FIG. 3 illustrates the set of deep reading measurements of FIG. 1 as including a set of deep reading quad combo suite of measurements;

FIG. 4 illustrates the deep reading quad combo suite of measurements as including a combination of seismic, electromagnetic, gravity, and pressure measurements;

FIG. 5 illustrates a more detailed description of the combination of seismic, electromagnetic, gravity, and pressure measurements of FIG. 4 as including electromagnetic and seismic measurements, electromagnetic and pressure measurements, electromagnetic and gravity measurements, and seismic and gravity measurements;

FIG. 8 illustrates a possible workflow for the integration of electromagnetic and production data (pressure and flow rates), FIG. 8 illustrating the method and apparatus by which electromagnetic and production data are integrated together to form a deep reading quad combo suite of measurements;

FIG. 9 illustrates a time snapshot of a water saturation spatial distribution;

FIG. 10 illustrates a time snapshot of a salt concentration spatial distribution;

FIG. 11 illustrates a time snapshot of a spatial distribution of the formation conductivity;

FIG. 12 illustrates a time snapshot of the spatial distribution of formation pressure; and FIG. 13 illustrates a computer system which stores the reservoir model and the reservoir simulator and the predictive or forward model of FIG. 1 and which receives the deep reading quad-combo suite of measurements as illustrated in FIGS. 4 and 5;

FIGS. 14 through 20 illustrate a "Method for Upscaling a Reservoir Model using Deep Reading Measurements" including a 'Software adapted for Constraining the Reservoir Simulator Using Multi-Well Data and Deep Reading Measurements' that is disclosed in this specification, wherein:

FIG. 14 illustrates a computer system adapted for storing the 'Software adapted for Constraining the Reservoir Simulator Using Multi-Well Data and Deep Reading Measurements', the computer system receiving the Multi-well Data and the 'Deep Reading Measurements';

FIG. 15 illustrates a workflow or flowchart that utilizes the aforementioned 'Geostatistical Approach', the workflow of FIG. 15 being illustrated in the above referenced U.S. Pat. No. 6,662,109 to Roggero et al issued on Dec. 9, 2003, corresponding to U.S. Patent Application Publication 2003/0028325 A1, published on Feb. 6, 2003, and entitled "Method of Constraining By Dynamic Production Data a Fine Model Representative of the Distribution in the Reservoir of a Physical Quantity Characteristic of the Subsoil Structure", the disclosure of which has already been incorporated by reference into the specification of this application;

FIGS. 16 and 17 illustrate a first embodiment of the 'Software adapted for Constraining the Reservoir Simulator Using Multi-Well Data and Deep Reading Measurements' that is stored in the computer system of FIG. 14;

FIGS. 18 and 19 illustrate a second embodiment of the 'Software adapted for Constraining the Reservoir Simulator Using Multi-Well Data and Deep Reading Measurements' that is stored in the computer system of FIG. 14; and FIG. 20 illustrates a set of 'Deep Reading Measurements', an integrated combination of two or more of which are used by the 'Software adapted for Constraining the Reservoir Simulator Using Multi-Well Data and Deep Reading Measurements', stored in the computer system of FIG. 14, to perform an upscaling process.

DESCRIPTION

Figure 1:
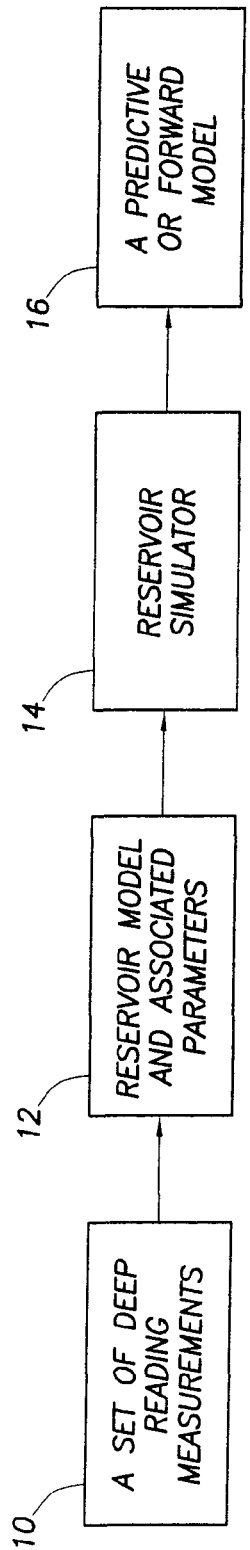

This specification discloses a 'method for reservoir upscaling using deep reading measurements'. When practicing an 'upscaling process' while using a simulation model to predict the production of oil and/or gas from a reservoir, a 'geostatistics' step was followed by an 'upscaling' step. This 'geostatistical approach' assumes that little variation occurs in the reservoir away from wells where data are available and this results in a poor estimate more often than we realize. However, when practicing the upscaling process, instead of using the 'geostatistics' step, this specification discloses using an 'Inversion of deep reading measurements constrained by upscaled multi-well data' step, which is also followed by the 'upscaling' step. In the alternative, when practicing the upscaling process, this specification also discloses using the 'geostatistics' step as an initial model followed by the 'Inversion of deep reading measurements constrained by upscaled multi-well data and an initial model' step which is also followed by the 'upscaling' step. In either workflow, by doing this 'constrained inversion', one has honored the near-wellbore data, provided extra information on the inter-well space and, in the process, one has performed the upscaling based on physics and measurements rather than based on statistical averaging or interpolation only.

The current practice in 'reservoir characterization' involves using 'near-wellbore logs' (e.g., Wireline, Logging While Drilling or LWD, etc.) and 'petrophysical models' (such as in 'ELAN') to estimate the static (and some dynamic) properties of the reservoir (e.g., porosity, saturation, mineralogy, etc.). These logs determine these properties (up to a radial depth of 10 ft or so away from the well) on a scale that is determined by their resolution, which can vary anywhere from few inches to few feet. However, not all such features will have an impact on a reservoir model that is on the scale of a flow unit which is usually on the order of 10's if not 100's of meters corresponding to the size of an 'Eclipse' flow grid. The issue, therefore, is: 'how to perform the upscaling'. For example, a thin bed detected by the 'Array Dynamic Tester (ADT)', with a depth of investigation of several inches, or even the '3D-Array Induction Tool (AIT)', with a depth of investigation of several feet, will have no impact on this 'upscaling' process unless we know that this thin layer extends sufficiently deep into the reservoir and, moreover, is either a permeability barrier (i.e., a very low permeability barrier that obstructs the flow) or a very high permeability streak (a super-k) in order to have a significant effect on flow.

Presently, when performing an 'upscaling process', a step called 'geostatistics' (along with an upscaling step) is used to both average the near-wellbore data at a coarser scale and then interpolate these data between wells. This 'geostatistical approach' assumes that little variation occurs in the reservoir away from wells where data are available and this results in a poor estimate more often than we realize.

However, when performing the 'upscaling process', instead of using the 'geostatistics' step, this specification discloses the use of 'deep reading measurements' (specifically, an integrated combination of 'two or more' of the 'deep reading measurements'), along with the upscaling step, to perform this 'upscaling process'.

An important potential use of 'deep reading measurements' is to perform the 'upscaling' from the 'near-wellbore multi-well data' to the scale of the reservoir. The 'deep reading measurements' can provide formation delineation on a distance scale (for both coverage and resolution) that is somewhere between near-wellbore logs and surface seismic. The use of these 'deep reading measurements' can be an alternative to the 'geostatistical approach' or the 'deep reading measurements' can be complementary to the 'geostatistical approach'.

The 'deep reading' suite of 'measurements' required for this 'upscaling' are the 'deep' ones as well as (or in addition to) the 'near-wellbore logs' (e.g., cores, LWD, wireline, permanent sensing).

As illustrated in FIG. 20, these 'deep reading measurements' may include:
  (1) long-offset single-well measurements (EM, sonic/seismic, gravity),
  (2) cross-well (EM and seismic),
  (3) surface EM: Magnetotellurics (MT), Controlled-source EM (CSEM), Spontaneous Potential (SP), Multi-channel transient EM (MTEM),
  (4) surface gravity,
  (5) surface to borehole (EM and seismic),
  (6) offset/walkaway/walkaround VSP,
  (7) transient pressure and multi-well interference testing,
  (8) electrokinetics: electro-seismic and seismo-electric,
  (9) permanent monitoring (EM, pressure, seismic), and
  (10) borehole radar and sonar.

As a result, instead of using only the aforementioned 'geostatistics' step, this specification discloses the use the aforementioned 'deep reading measurements' (specifically, an integrated combination of two or more of the 'deep reading measurements' illustrated in FIG. 20), which are 'constrained by' the near-wellbore data, surface seismic data, and/or any other information or data relating to the local geology of the reservoir field, either alone or in combination with the above referenced 'geostatistics' step, in order to build a 'reservoir model' on a scale that is comparable to the one required by either 'Eclipse' or the multi-phase, multi-well, multi-layer 'GREAT' (taking advantage of the built-in history matching techniques in 'GREAT'). The scale will be determined by the resolution of the "deep reading measurements which are constrained by the near-wellbore data, surface seismic and any information on the local geology of the field". In doing this 'constrained inversion', one has honored the near-wellbore data, provided extra information on the inter-well space and, in the process, one has performed the 'upscaling' based on physics and measurements rather than based on 'statistical averaging' or interpolation. In addition, the benefit of using the 'deep reading measurements constrained by the multi-well data' step (instead of, or in addition to, using the aforementioned 'geostatistics' step) is that the 'reservoir model' or 'simulation model' will more accurately reflect the true reservoir conditions. As a result, the simulation performed by the 'simulation model' will significantly improve 'reservoir predictive modeling' for use in field management. Moreover, this improved 'reservoir predictive modeling' will lead to: improved recovery, higher certainty in forecasting, more insight relative to any remaining reserve distribution, and a significant reduction in modeling uncertainty.

In the above paragraphs, the terms 'ELAN', 'Eclipse', 'Array Dynamic Tester (ADT)', '3D-Array Induction Tool (AIT)', and 'GREAT' are acronyms for products and services that are owned and operated by Schlumberger Technology Corporation of Houston, Tex. In addition, the term GREAT refers to a 'fast flow simulation software' which is set forth in U.S. Pat. No. 7,069,148 B2 to Thambynayagam et al, entitled "Gas Reservoir Evaluation and Assessment Tool Method and Apparatus and Program Storage Device", the disclosure of which is incorporated by reference into the specification of this application.

Referring to FIGS. 1 through 13, a discussion of a "Method for Reservoir Characterization and Monitoring including Deep Reading Quad Combo Measurements", that is set forth in prior pending application Ser. No. 12/004,792, filed Dec. 21, 2007, is set forth in the following paragraphs with reference to FIGS. 1 through 13 of the drawings.

In FIGS. 1 through 13, a method is disclosed for building a predictive or forward model adapted for predicting the future evolution of a reservoir, where the method includes: integrating together a plurality of measurements thereby generating an integrated set of deep reading measurements, the integrated set of deep reading measurements being sufficiently deep to be able to probe the reservoir and being self-sufficient in order to enable the building of a reservoir model and its associated parameters; generating a reservoir model and associated parameters in response to the integrated set of deep reading measurements; and receiving, by a reservoir simulator, the reservoir model and, responsive thereto, generating, by the reservoir simulator, the predictive or forward model. The integrated set of deep reading measurements includes combinations of a plurality of the following measurements: seismic measurements, electromagnetic measurements, gravity measurements, and pressure measurements. The integrated set of deep reading measurements can also include combinations of two of the following measurements: the seismic measurements, the electromagnetic measurements, the gravity measurements, and the pressure measurements. The aforesaid combinations of two of the following measurements are selected from a group consisting of: Electromagnetic and Seismic measurements, Electromagnetic and Pressure measurements, Electromagnetic and Gravity measurements, and Seismic and Gravity measurements. The integrated set of deep reading measurements also includes combinations of three of the following measurements: the seismic measurements, the electromagnetic measurements, the gravity measurements, and the pressure measurements. The integrated set of deep reading measurements also includes all four of the following measurements in combination: the seismic measurements, the electromagnetic measurements, the gravity measurements, and the pressure measurements.

In FIGS. 1 through 13, a set of deep reading measurements are sufficiently deep to be able to probe the reservoir and are self-sufficient to provide a means by which a reservoir model and its associated parameters can be built. Such a model can be the input to a reservoir simulator, which, in principle, will provide a mechanism for building a predictive or forward model.

Reservoir simulators receive, as input, a set of 'input parameters', which, if known exactly, would allow the reservoir simulations to deterministically predict the future evolution of the reservoir (with an associated uncertainty error). However, it is generally assumed that the 'input parameters' are poorly known. As a result, the poorly known 'input parameters' represent the 'dominant uncertainty' in the modeling process. Hence, a judicial selection of measurements, adapted for providing or defining the 'input parameters', will have a real impact on the accuracy of these input parameters.

A 'suite of measurements' are disclosed in this specification which are hereinafter referred to as a "deep-reading quad-combo suite of measurements". The deep-reading quad-combo suite of measurements includes: seismic measurements, electromagnetic measurements, gravity measurements, and pressure measurements as well as all the possible combinations of these four measurements (i.e. two and three of these measurements at a time and also all four of these measurements) in a joint interpretation/inversion. Such a quad-combo suite of measurements represents the reservoir counterpart of the 'triple-combo' for well logging. This 'deep quad-combo' suite of measurements can have several manifestations, depending on the way they are deployed: from the surface, surface-to-borehole (or borehole-to-surface), cross-well, or even in a long-offset single-well deployment, or a combination of any or all of the above. Each of these four 'deep reading' measurements, on their own, will have problems in delivering useful or sufficiently comprehensive information about the reservoir because of the non-uniqueness and limited spatial resolution that are sometimes associated with their interpretation. However, when the above referenced four 'deep reading' measurements as well as all the possible combinations of these four measurements (i.e. two and three of these measurements at a time and also all four of these measurements) in a joint interpretation/inversion are "integrated" together, and perhaps, in addition, are integrated with other measurements [such as 'near-wellbore' Wireline (WL) and Logging While Drilling (LWD)], the above referenced 'deep reading quad-combo suite of measurements' will provide 'considerable value' and 'significant differentiation' to the set of 'input parameters' that are received by the reservoir simulators. As a result, a more accurate predictive or forward reservoir model will be generated.

Referring to FIG. 1, a method is illustrated that is responsive to a set of deep reading measurements for the purpose of generating a predictive or forward reservoir model that can accurately predict the performance of a reservoir. In FIG. 1, a set of deep reading measurements 10 are provided, the deep reading measurements 10 being sufficiently deep in order to probe a reservoir and being self-sufficient in order to provide a means by which a reservoir model and its associated parameters 12 can be built. The reservoir model 12 is input to a reservoir simulator 14, which, in principle, will provide a mechanism for building a predictive or forward reservoir model 16.

Figure 2:
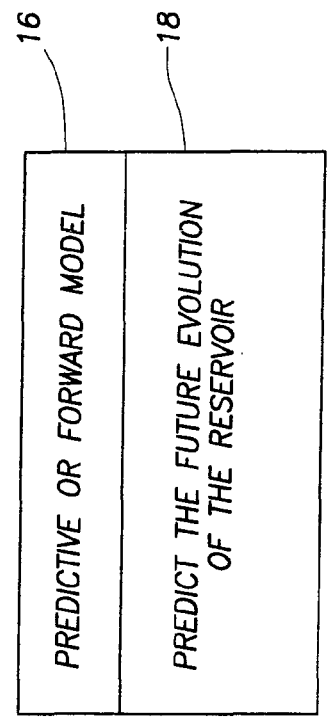

Referring to FIG. 2, the predictive or forward model 16 will predict the future evolution of the reservoir 18.

Figure 3:
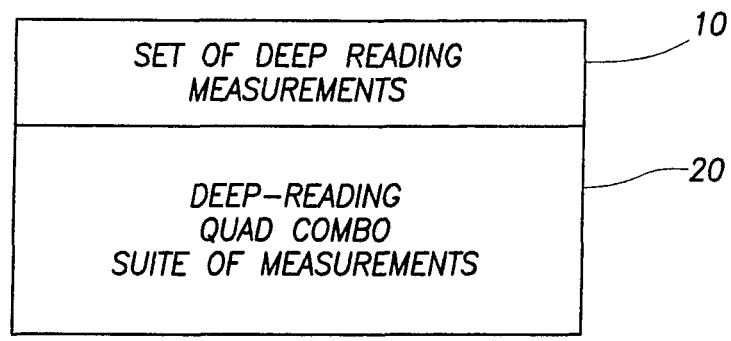

Referring to FIG. 3, the set of deep reading measurements 10 of FIG. 1 actually includes a 'deep-reading quad-combo suite of measurements' 20.

Figure 4:
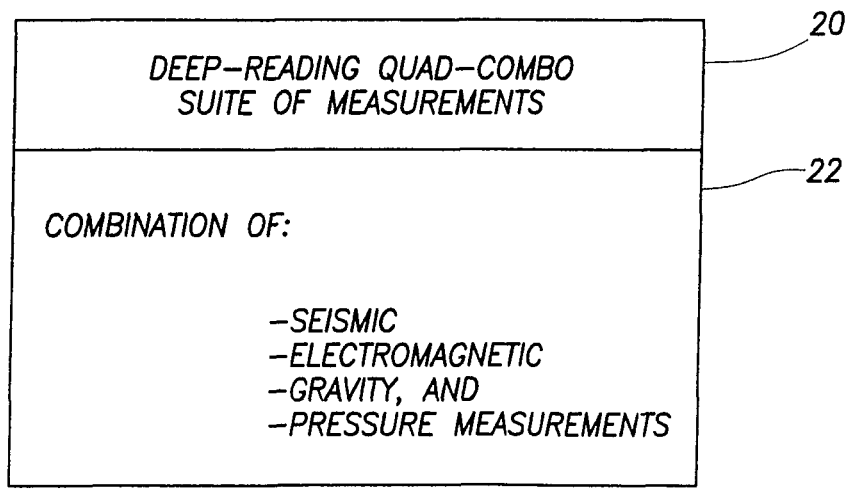

Referring to FIG. 4, an 'integrated combination' of seismic measurements, electromagnetic measurements, gravity measurements, and pressure measurements' 22 is illustrated. In FIG. 4, the 'deep-reading quad-combo suite of measurements' 20 of FIG. 3 includes an 'integrated' combination of: (1) seismic measurements, (2) electromagnetic measurements, (3) gravity measurements, and (4) pressure measurements, as indicated by numeral 22 of FIG. 4. That is, the 'deep-reading quad-combo suite of measurements' 20 include integrated combinations of the individual measurements (seismic, electromagnetic, gravity, and pressure) and all possible combinations of these four measurements (two and three of these measurements at a time and also all four of these measurements) in a joint interpretation/inversion. As noted earlier, these deep-reading quad-combo suite of measurements 20 (i.e., the 'integrated combination' of seismic, electromagnetic, gravity, and pressure measurements as well as all possible combinations thereof 22 of FIG. 4), when 'integrated together', and perhaps, in addition, when 'integrated together' with other measurements, such as near-wellbore WL and LWD, will provide considerable value and significant differentiation.

Figure 5:
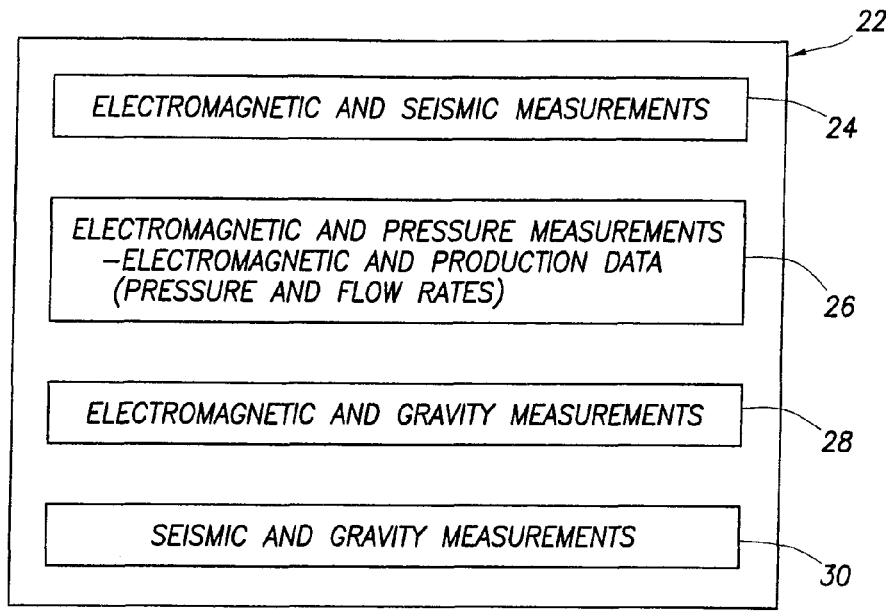

Referring to FIG. 5, one example of the 'combination of seismic measurements, electromagnetic measurements, gravity measurements, and pressure measurements' 22 of FIG. 4 is illustrated in greater detail. In FIG. 5, one example of the 'integrated combination' of seismic measurements, electromagnetic measurements, gravity measurements, and pressure measurements' 22 of FIG. 4 includes the following combination of measurements: (1) Electromagnetic and Seismic measurements 24, (2) Electromagnetic and Pressure measurements (i.e., Electromagnetic and Production Data (such as pressure and flow rates) 26, (3) Electromagnetic and Gravity measurements 28, and (4) Seismic and Gravity measurements 30. However, as noted earlier, the 'combination of seismic measurements, electromagnetic measurements, gravity measurements, and pressure measurements' 22 of FIG. 4 also includes integrated combinations of the individual measurements (i.e., seismic, electromagnetic, gravity, and pressure) as well as all the possible combinations of these four measurements (i.e., two and three at a time and also all four) in a joint interpretation/inversion.

Referring to FIGS. 6a through 12, from an interpretation viewpoint, integration of this suite of measurements 20, 22 of FIGS. 4 and 5 can be carried out at various levels: by constraining the inversion at the level of the formation structural information (bedding, faults, fractures, initial fluid contacts, etc.) or at the level of a more fundamental petrophysical description of the reservoir in terms of its static and dynamic properties (mineralogy, porosity, rock permeability, fluid PVT properties, capillary pressure, relative permeability, fluid saturations, fluid contacts, etc.), or a hybrid approach that combines a mix of the above sets of reservoir attributes. Irrespective of what approach one may adopt, the desirable list of answer products could be producibility, estimates of hydrocarbon volumes in place, and/or any other parameters that are needed to characterize a reservoir and are relevant to geologists/geophysicists, petrophysicists and reservoir engineers for the purpose of managing the reservoir. The benefits of such an approach is to generate a unified reservoir management model that honors diverse sources of information in a coherent and consistent manner and to provide answers that constitute direct inputs to reservoir management.

Measurement synergies will be determined by a particular application and the associated workflow required in delivering the needed answer products for such an application. These synergies can be grouped by two possible scenarios for an integrated interpretation:

1. Given a set of measurements, determine the reservoir parameters that have the most sensitive response to these measurements and only estimate these parameters.
2. For a desired reservoir parameter(s) to be estimated, perform the measurements that are most sensitive to these parameters and only integrate these measurements.

A partial list of applications for such a quad-combo 20 of FIG. 4 is in:
Hydrocarbon detection:
  Identifying geological targets containing undrained hydrocarbons prior to and during drilling,
  Locating bypassed hydrocarbons in brown fields,
  Geosteering & well placement.
Reservoir fluid monitoring:
  Enhanced recovery applications,
  Monitoring production and fluid movement in conjunction with fluid injection programs (efficiency of sweep) particularly:
    if used in a time-lapse mode,
    when constrained using a priori information (e.g., knowledge of the amount of water injected)
  Detecting and monitoring water and gas coning,
  Identifying fluid contacts—geosteering.
Reservoir characterization:
  Structural geology: input to 3D geological models,
  Reservoir compartmentalization,
  Fracture distribution,
  Fluid contacts,
  Upscaling: near-wellbore to reservoir scale,
  History matching/reservoir simulation,
  Geomechanics,
  Reservoir property distribution, e.g.:
    Porosity partitioning in inter-well,
    Porosity deep in the formation,
    Relative permeability,
    Capillary pressure.
Reservoir management:
  Improved completion design,
  Well planning,
  Intervention and target infill drilling.
Other monitoring applications:
  Stimulation monitoring,
  Frac monitoring,
  CO2 sequestration and seepage monitoring,
  Gas production monitoring,
  Gas storage monitoring.

In the following sections of this specification, we highlight the benefits of the various synergies. The following 'integrated combinations' of the individual measurements (i.e., seismic, electromagnetic, gravity, and pressure) are set forth in the following sections of this specification: (1) Electromagnetic and Seismic measurements, (2) Electromagnetic and Pressure measurements, (3) Electromagnetic and Gravity measurements, and (4) Seismic and Gravity measurements.

Electromagnetic (EM) and Seismic Measurements 24 of FIG. 5

The combination of EM and seismic data could have a variety of benefits for improved reservoir characterization. Seismic provides structural information and EM identifies hydrocarbon versus brine. Additionally, each method is sensitive to the rock porosity; the combination will better define it. The fluid saturation distribution in 3-phase reservoir environment will also be greatly improved mainly by using the EM-based resistivity distribution to segregate insulating (gas and oil) fluid phases from conducting (water) phases. The combination will also allow for a better description of the field geology as EM is better able to define the distribution of low resistivity structures, an example being sub-salt or sub-basalt reservoir structure, where seismic exhibits rapid variation in velocity and attenuation causing imaging problems of the target beneath. There is also the potential for better image resolution; for example EM may be able to provide an updated seismic velocity model (through property correlations) that can lead to an improved depth migration. Finally, EM/seismic combination allows for the reduction of exploration risks, particularly in deep-water environments, prospect ranking and detecting stratigraphic traps.

The methods for this integration could be sequential: for example using the seismic as a template for the initial model, allowing the EM data to adjust this model to fit observations and using petrophysics obtained from logs and core to obtain reservoir parameter distributions from the data. An alternative approach could be alternating between the EM and seismic inversions (starting with seismic) where the inversion result of one is used to constraint the other. In such an approach, any artifacts that are introduced by one inversion will eventually be reduced as we alternate the inversion between EM and seismic since ultimately we will reconstruct a model that is consistent with both EM and seismic data. A third alternative approach is the full joint inversion (simultaneous inversion) of EM and seismic.

Figure 6A:
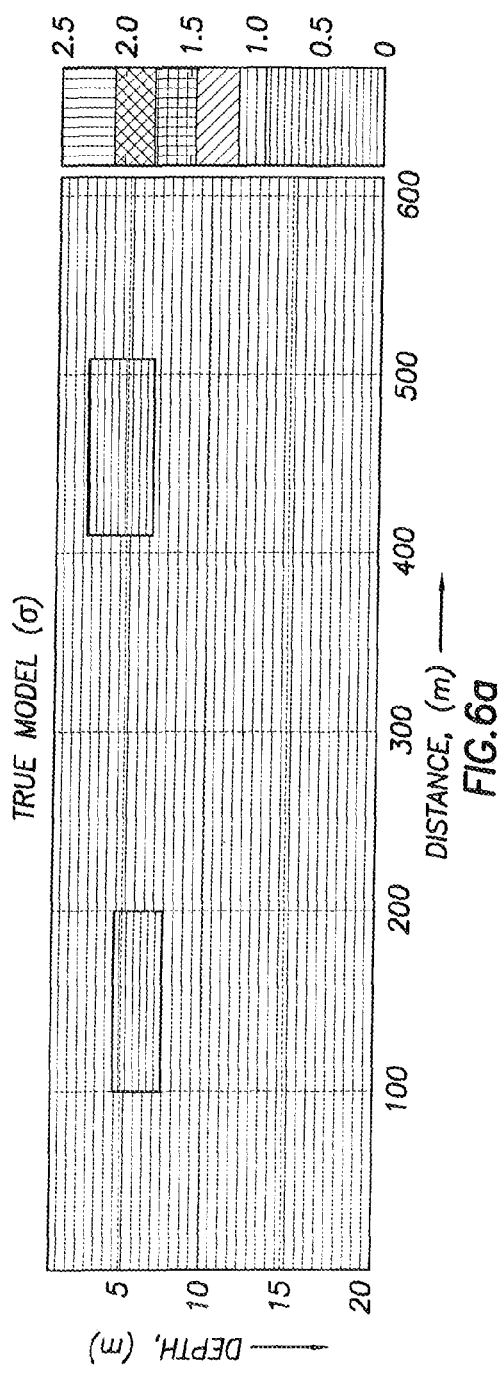
FIGS. 6a-6b illustrate a true model of conductivity and velocity.
Figure 6B:
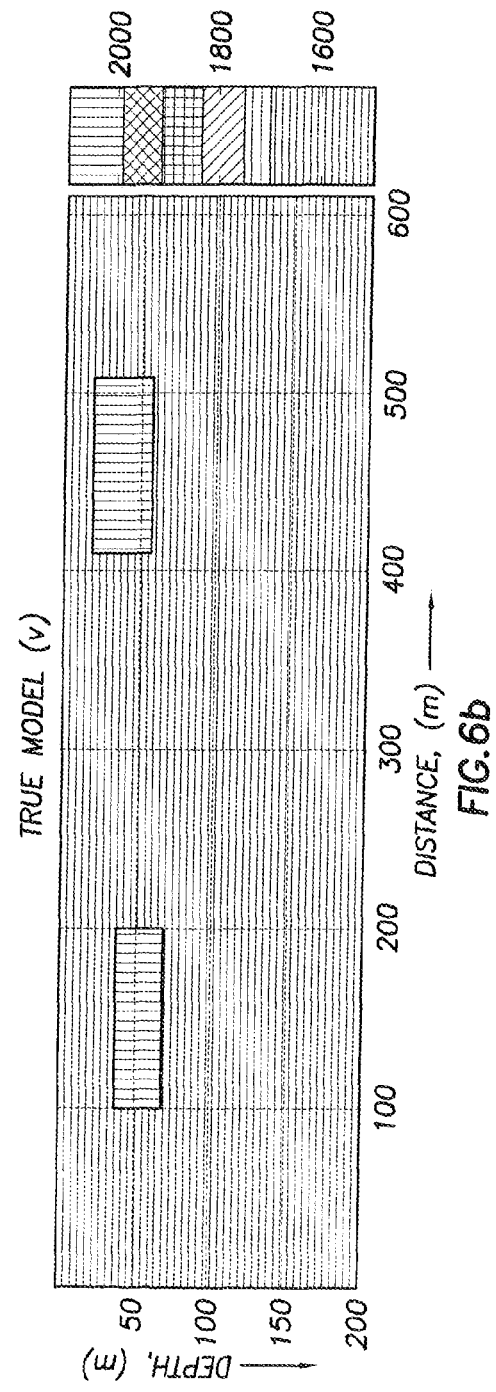

Refer now to FIGS. 6a-6b which illustrate a true model of conductivity and velocity.

Figure 7A:
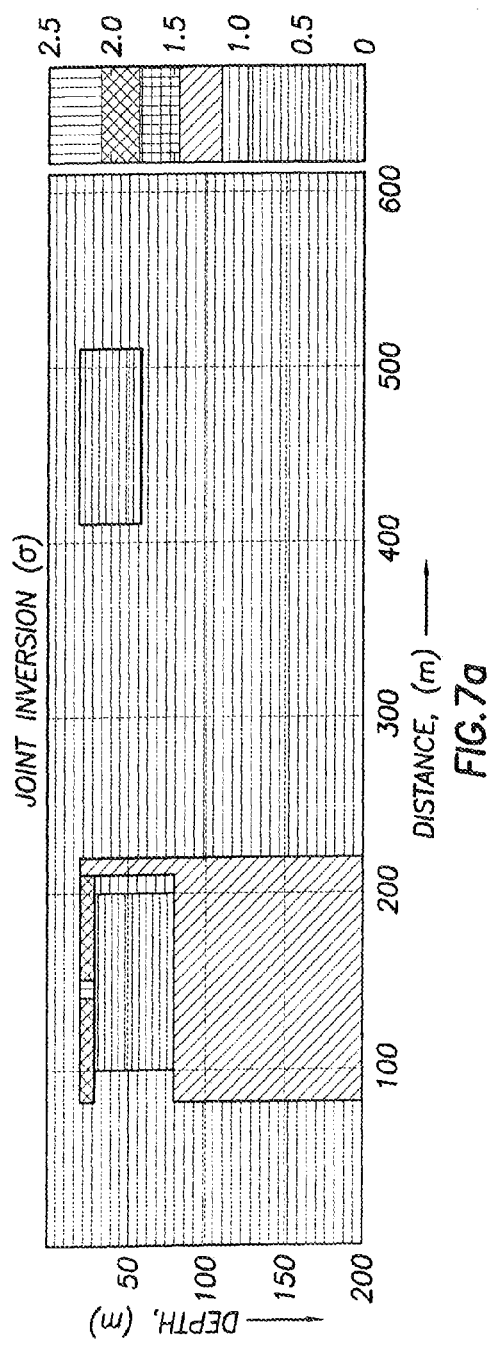
FIGS. 7a-7b illustrate a reconstructed conductivity and velocity from the joint inversion of electromagnetic (EM) and seismic.
Figure 7B:
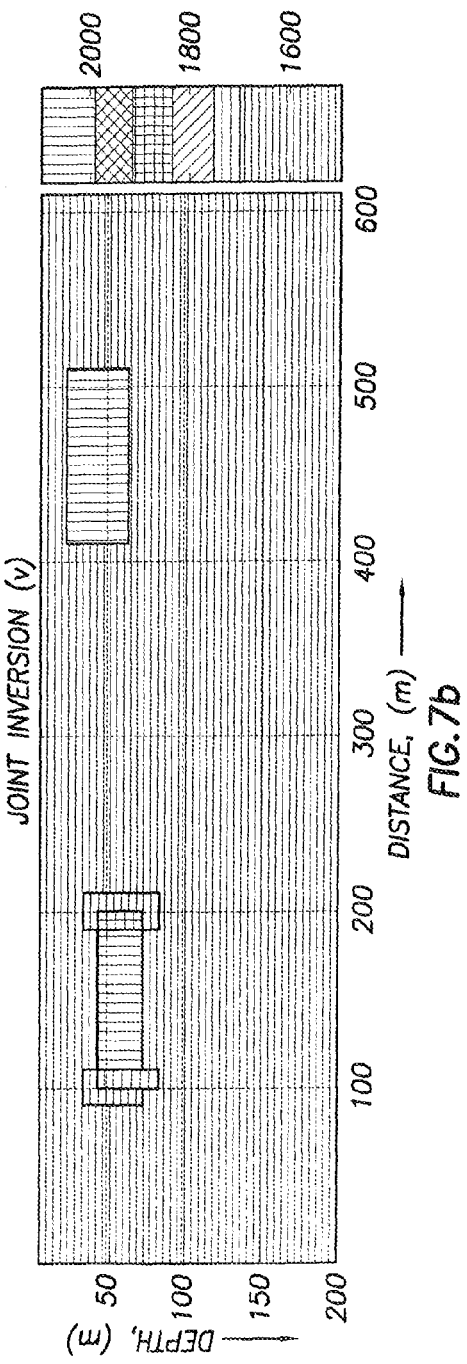

Refer also to FIGS. 7a-7b which illustrate a reconstructed conductivity and velocity from the joint inversion of Electromagnetic (EM) and seismic.

Electromagnetic and Production Data (Pressure and Flow Rates) 26 of FIG. 5

Electromagnetic (EM) measurements are most sensitive to the water content in the rock pores. Moreover, the formation's petrophysical parameters can have a strong imprint on the spatial distribution of fluid saturations and consequently on EM measurements. EM measurements can also be quite effective in tracking waterfronts (because of the relatively high contrast in electrical conductivities) particularly if they are used in a time-lapse mode and/or when constrained using a priori information (e.g., knowledge of the amount of water injected). In such applications, cross-well, long-offset single-well, surface and surface-to-borehole EM measurements can benefit from constraining the inversion using a fluid flow model. This can be done by linking the EM simulator to a fluid flow simulator (e.g., GREAT/Intersect, Eclipse) and using the combined simulator as a driver for an iterative inversion.

On the other hand, integrating time-lapse EM measurements acquired in cross-well, single-well, surface or surface-to-borehole modes with flow-related measurements such as pressure and flow-rate measurements from MDT or well testing can significantly improve the robustness of mapping water saturation and tracking fluid fronts. The intrinsic value of each piece of data considerably improves when used in a cooperative, integrated fashion, and under a common petrophysical model.

Physics of multi-phase fluid-flow and EM induction/conduction phenomena in porous media can be coupled by means of an appropriate saturation equation. Thus, a dual-physics stencil for the quantitative joint interpretation of EM and flow-related measurements (pressure and flow rates) can be formulated to yield a rigorous estimation of the underlying petrophysical model. The inverse problem associated with dual-physics consists of the estimation of a petrophysical model described by spatial distribution of porosities and both vertical and horizontal absolute permeabilities.

Figure 8:
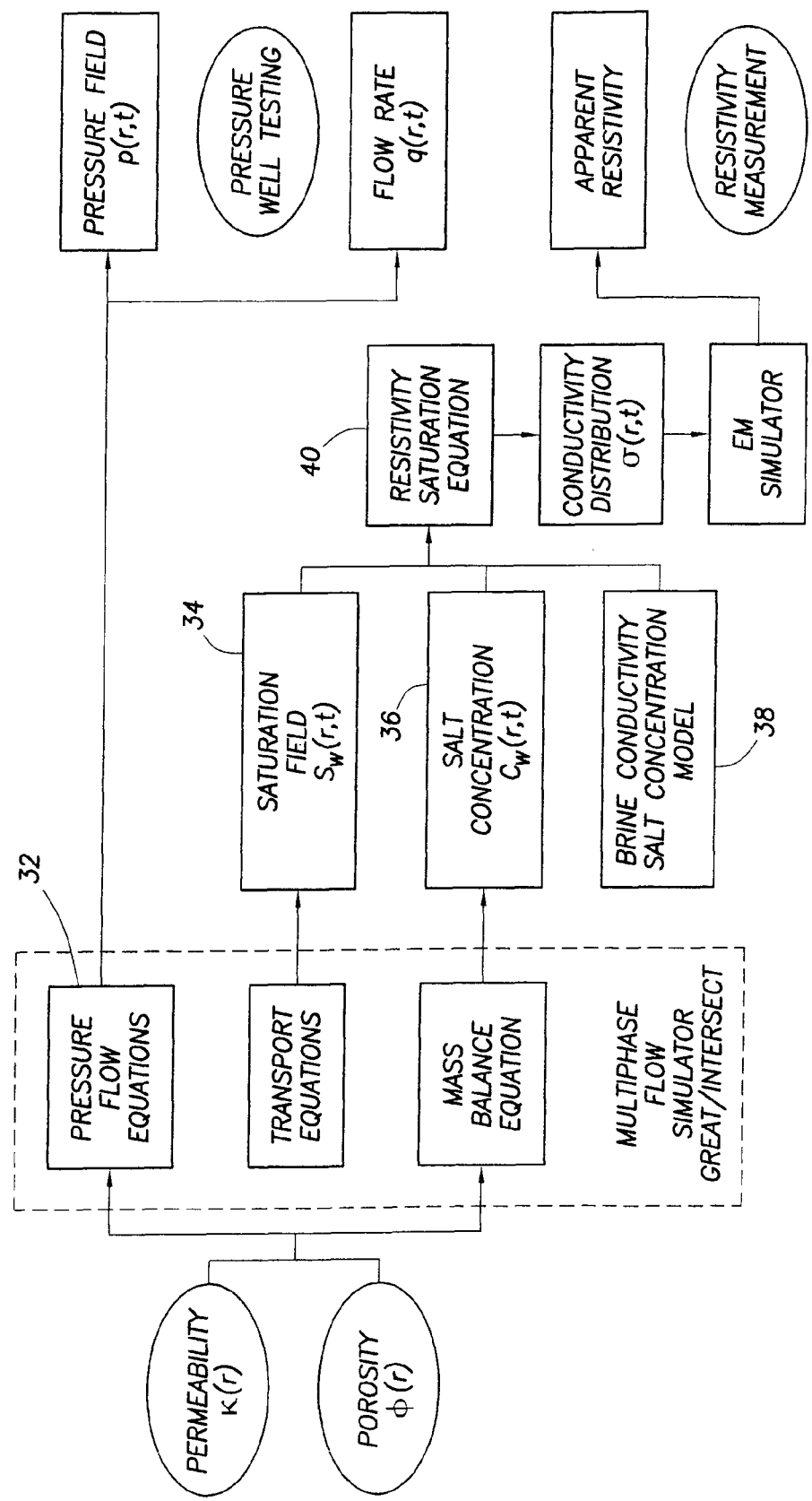

Refer now to FIG. 8 which illustrates a possible workflow for the integration of electromagnetic and production data (pressure and flow rates), FIG. 8 illustrating the method and apparatus by which electromagnetic and production data are integrated together to form a deep reading quad combo suite of measurements.

In FIG. 8, Pressure 32, saturation 34, and salt concentration 36 fields generated during water injection or production and a subsequent well testing or a wireline formation test can be modeled as multi-phase convective transport of multiple components. Isothermal salt mixing phenomenon taking place within the aqueous-phase due to the invading and in-situ salt concentration can also be taken into account in the context of an EM measurement by means of a brine conductivity model 38. 'Coupling or integrating multi-phase flow and EM physics' is accomplished via Archie's saturation equation 40 or similar saturation equations 40. The result of the aforementioned 'coupling or integrating multi-phase flow and EM physics' will yield a pressure, water saturation, and conductivity spatial maps as a function of time and space.

Figure 9:
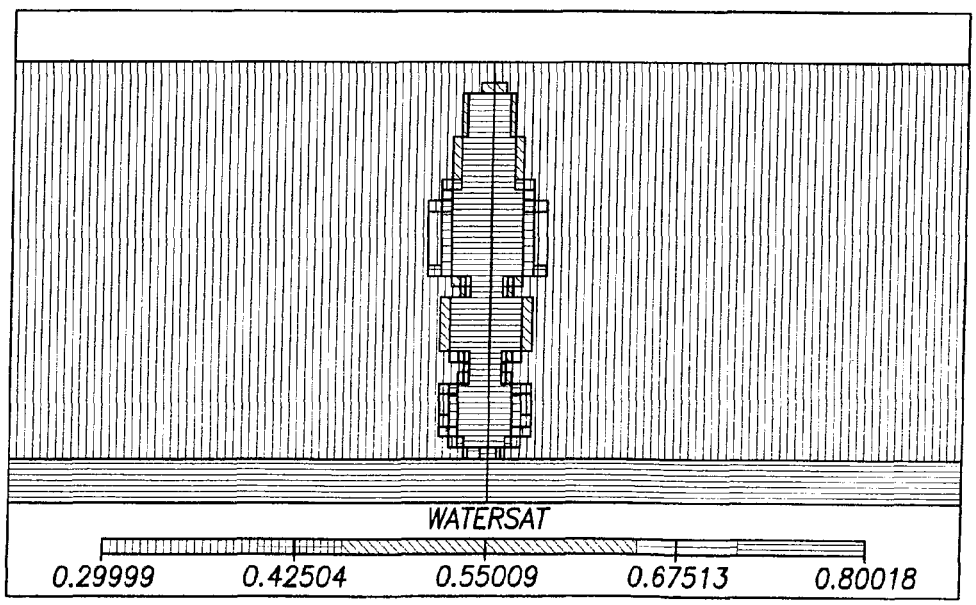

Refer to FIG. 9 illustrating a time snapshot of the water saturation spatial distribution.

Figure 10:
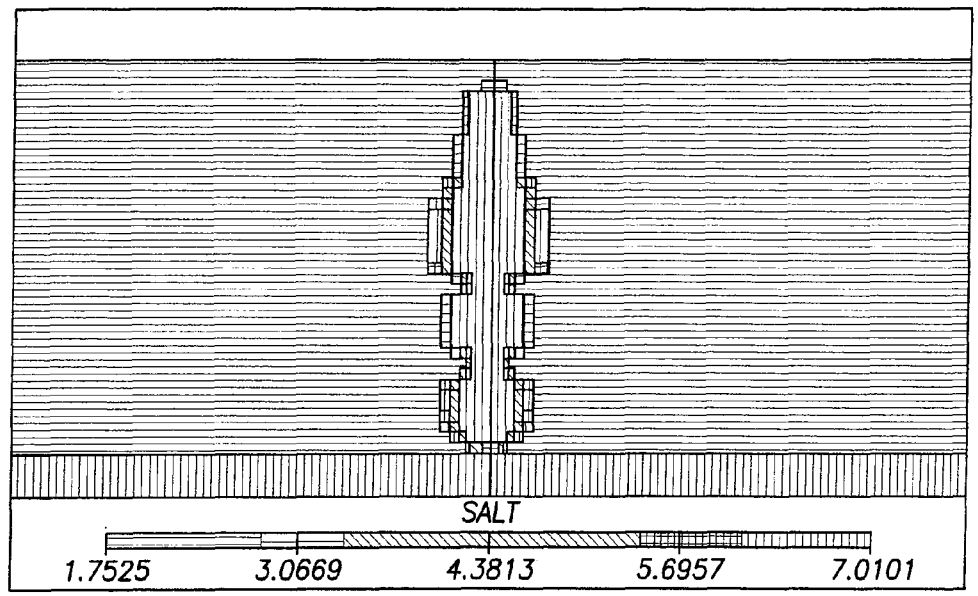

Refer to FIG. 10 illustrating a time snapshot of the salt concentration spatial distribution.

Figure 11:
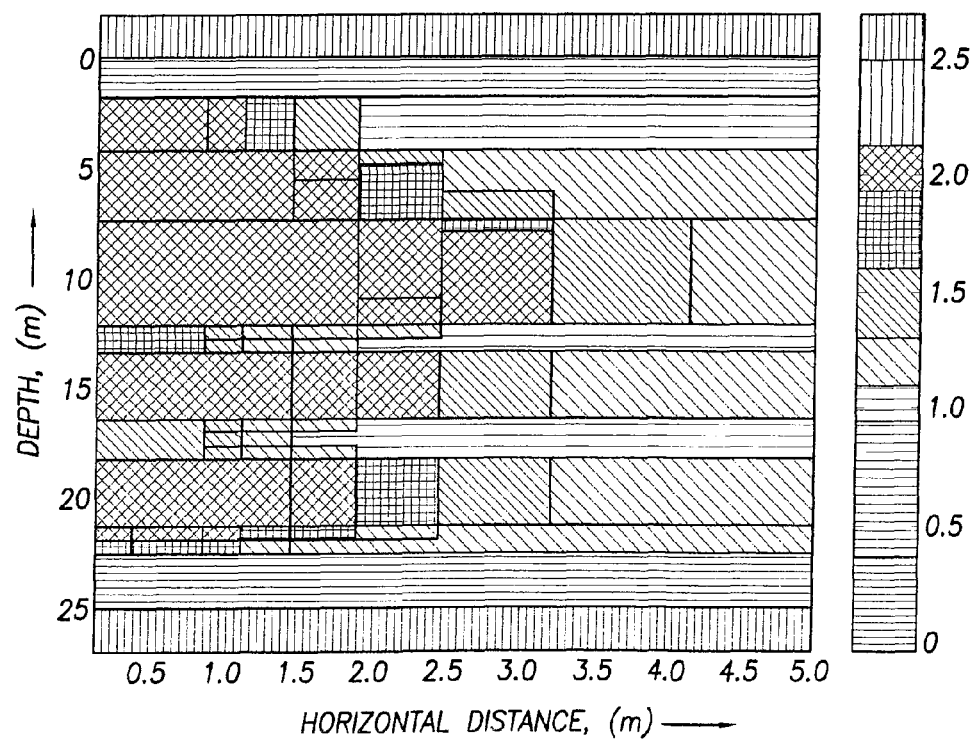

Refer to FIG. 11 illustrating a time snapshot of the spatial distribution of the formation conductivity.

Figure 12:
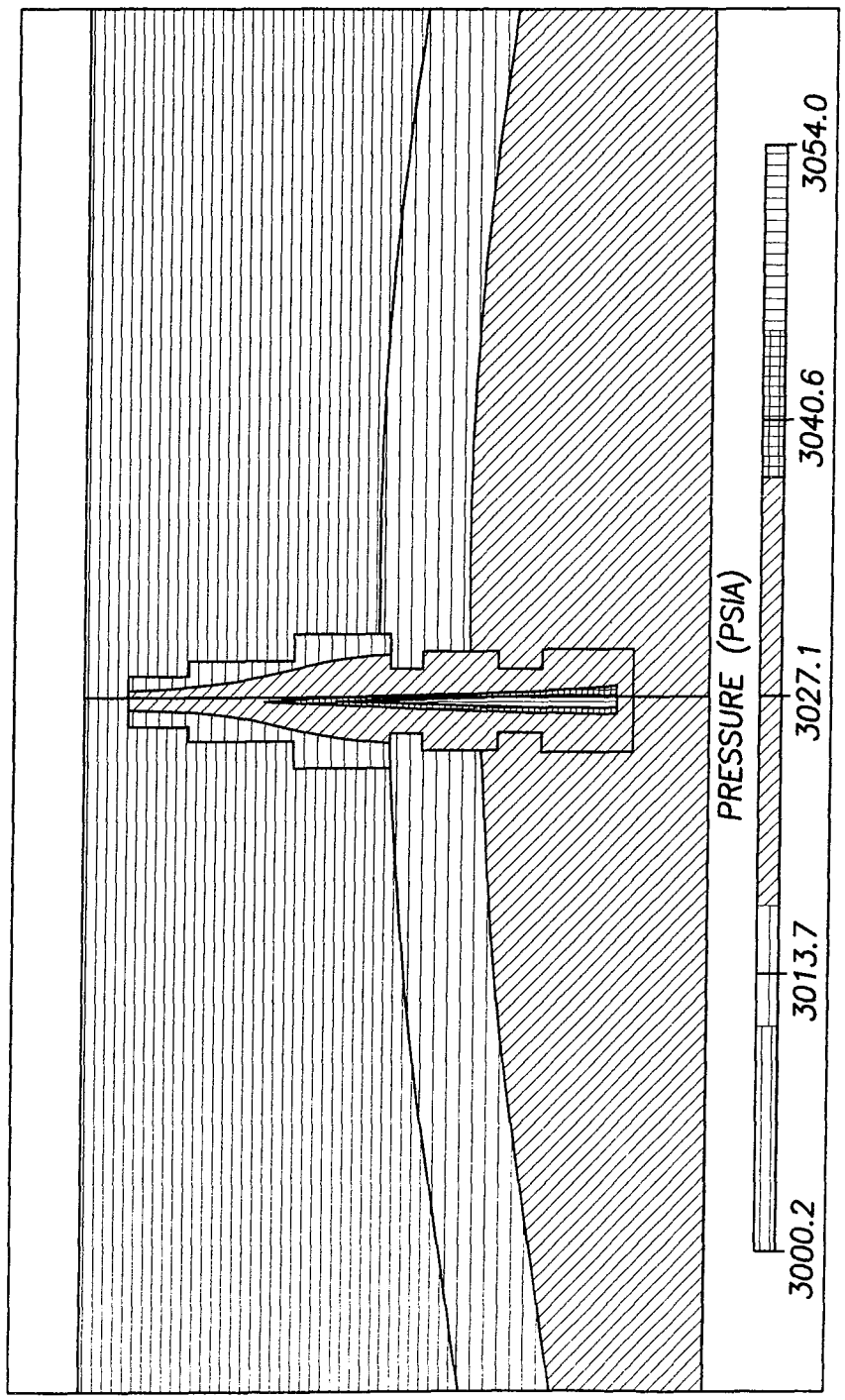

Refer to FIG. 12 illustrating a time snapshot of the spatial distribution of formation pressure.

Role of the Gravity Measurement: Electromagnetic and Gravity Measurements 28 of FIG. 5, and Seismic and Gravity Measurements 30 of FIG. 5

Among the four measurements constituting the quad-combo 20, 22, 28, 30 of FIGS. 4 and 5, gravity is the measurement that is most sensitive to the presence of gas because of the high contrast in density between gas and other fluids or the matrix rock. Hence, the major application for a borehole gravity measurement is in monitoring gas/liquid contacts (gas/oil and gas/water contacts) and in detecting gas coning—particularly in a time-lapse mode. Secondary applications are monitoring oil/water contacts, imaging salt domes and reefs, measuring the average porosity of vuggy carbonates and in monitoring gas and water floods. As such, gravity measurements can be an excellent compliment to both EM and seismic measurements.

Moreover, the most basic formation evaluation suite of measurements for volumetric analysis relies on a good estimate of the formation density. A gravity measurement (either from the surface or downhole) can provide a reliable and deep probing estimate of the formation density.

Possible synergies between the four measurements of the quad-combo could be:
  Combining EM and gravity can provide a good estimate of
    changes in water saturation from EM and in gas saturation from gravity measurements
  Both seismic and gravity measurements are sensitive to
    density, hence by combining density derived from gravity and seismic velocity one can estimate average rock compressibility.
  EM is sensitive to water/oil contacts whereas gravity (as
    well as seismic) is sensitive to gas/oil contacts. Hence by integrating these measurements one can accurately map the various fluid contacts.

Figure 13:
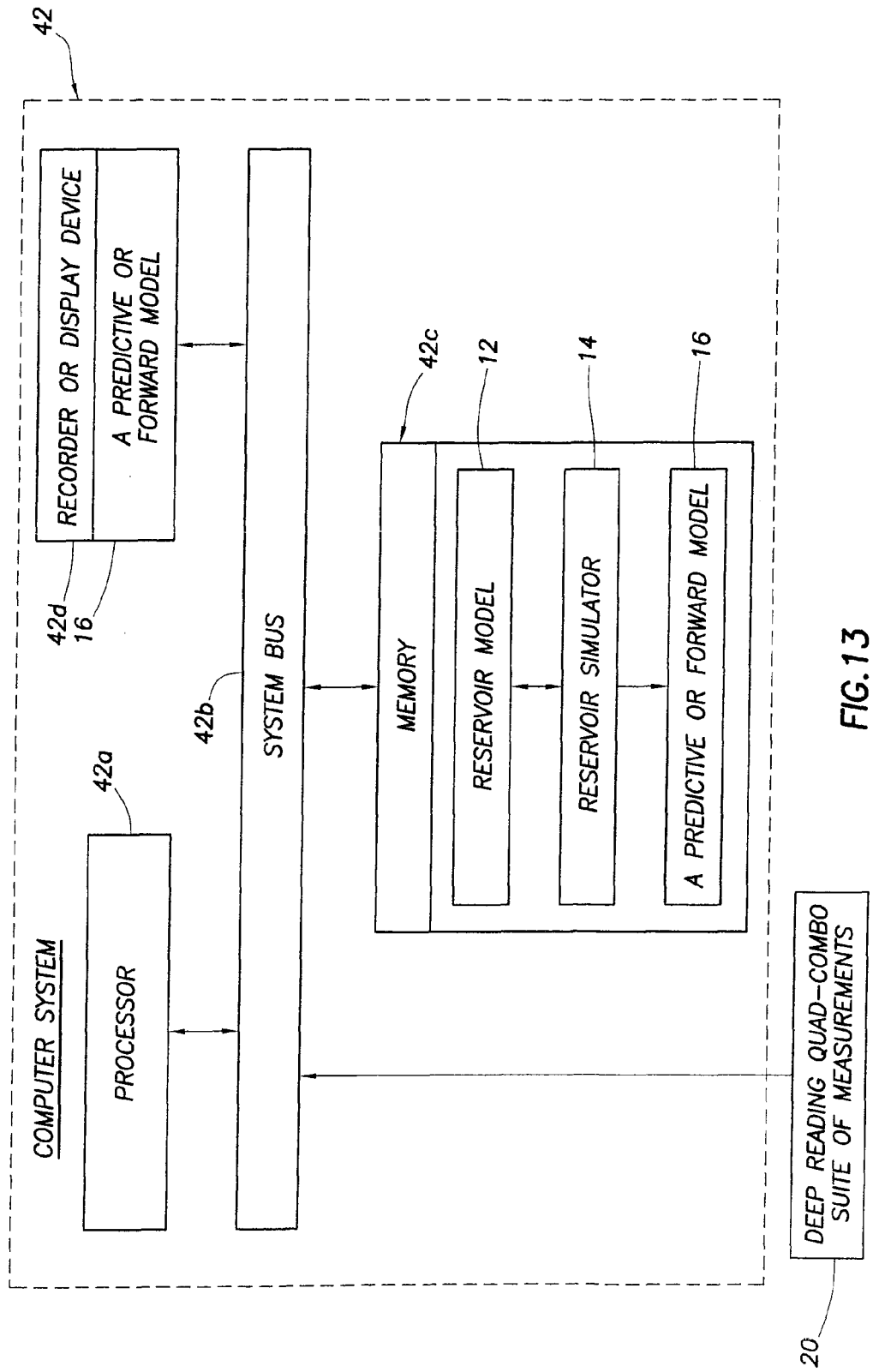

Referring to FIG. 13, a workstation or other computer system 42 is illustrated. The computer system 42 of FIG. 13 is adapted for storing the reservoir model and the reservoir simulator and the predictive or forward model of FIG. 1 and it receives the deep reading quad-combo suite of measurements 20, 22 as illustrated in FIGS. 4 and 5.

In FIG. 13, the workstation, personal computer, or other computer system 42 is illustrated adapted for storing the reservoir model 12 and the reservoir simulator 14 and the predictive or forward model 16 of FIG. 1 and it receives the deep reading quad-combo suite of measurements 20, 22 as illustrated in FIGS. 4 and 5. The computer system 42 of FIG. 13 includes a Processor 42a operatively connected to a system bus 42b, a memory or other program storage device 42c operatively connected to the system bus 42b, and a recorder or display device 42d operatively connected to the system bus 42b. The memory or other program storage device 42c stores the reservoir model 12 and the reservoir simulator 14 and the predictive or forward model 16 of FIG. 1 and it receives the deep reading quad-combo suite of measurements 20, 22 as illustrated in FIGS. 4 and 5 as disclosed in this specification. The reservoir model 12 and the reservoir simulator 14 which are stored in the memory 42c of FIG. 13, can be initially stored on a Hard Disk or CD-Rom, where the Hard Disk or CD-Rom is also a 'program storage device'. The CD-Rom can be inserted into the computer system 42, and the reservoir model 12 and the reservoir simulator 14 can be loaded from the CD-Rom into the memory/program storage device 42c of the computer system 42 of FIG. 13. In FIG. 13, the computer system 42 receives 'input data' 20 including the deep-reading quad-combo suite of measurements 20, 22 as discussed previously in this specification. In operation, the Processor 42a will build a reservoir model and its associated parameters 12 in response to the deep-reading quad-combo suite of measurements 20 that is input to the computer system 42. The reservoir model 12 will be the input to a reservoir simulator 14. The processor 42a will then cause the reservoir simulator 14 to build the predictive or forward model 16 in response to the reservoir model 12. The Processor 42a will then generate an 'output display' that can be recorded or displayed on the Recorder or Display device 42d of FIG. 13. The 'output display', which is recorded or displayed on the Recorder or Display device 42d of FIG. 13, can generate and display the predictive or forward model 16. The computer system 42 of FIG. 13 may be a personal computer (PC), a workstation, a microprocessor, or a mainframe. Examples of possible workstations include a Silicon Graphics Indigo 2 workstation or a Sun SPARC workstation or a Sun ULTRA workstation or a Sun BLADE workstation. The memory or program storage device 42c (including the above referenced Hard Disk or CD-Rom) is a 'computer readable medium' or a 'program storage device' which is readable by a machine, such as the processor 42a. The processor 42a may be, for example, a microprocessor, microcontroller, or a mainframe or workstation processor. The memory or program storage device 42c, which stores the reservoir model 12 and the reservoir simulator 14 and the predictive or forward model 16, may be, for example, a hard disk, ROM, CD-ROM, DRAM, or other RAM, flash memory, magnetic storage, optical storage, registers, or other volatile and/or non-volatile memory.

A functional description of the operation of the 'method for reservoir characterization and monitoring including deep reading quad combo measurements' as described in this specification is set forth in the following paragraphs with reference to FIGS. 1 through 13 of the drawings.

In this specification, a set of deep reading measurements 10 of FIG. 3, comprising a 'deep reading quad combo' suite of measurements 20 of FIG. 3, are sufficiently deep to be able to probe the reservoir and are self-sufficient to provide the means by which we can build a reservoir model and its associated parameters 12 of FIG. 1. Such a reservoir model 12 will be the input to a reservoir simulator 14 of FIG. 1, which, in principle, will provide a mechanism for building the predictive or forward model 16 of FIG. 1. Recall that Reservoir simulators 14 take as input a 'set of parameters', which if known exactly would allow the simulations to deterministically predict the future evolution of the reservoir (with an associated uncertainty error). However, it is generally assumed that the fact that the 'set of input parameters' are poorly known is the dominant uncertainty in the modeling process. Hence a judicial selection of measurements needs to have an impact on the accuracy of these input parameters. As a result, a 'suite of measurements' disclosed in this specification (which we refer to as the "deep-reading quad-combo" suite of measurements 20 of FIG. 4) include 'integrated' combinations of: (1) seismic, (2) electromagnetic, (3) gravity, and (4) pressure measurements, as noted by numeral 22 of FIGS. 4 and 5, and, in addition, (5) all the possible combinations of these four measurements (that is, two and three of these measurements at a time and also all four of these measurements) in a joint interpretation/inversion. Each of these four deep measurements which comprise the "deep-reading quad-combo" 20 of FIG. 4, individually and on their own, will have problems in delivering useful or sufficiently comprehensive information about the reservoir because of the non-uniqueness and limited spatial resolution that are sometimes associated with their interpretation. However, when the 'four deep measurements' which comprise the "deep-reading quad-combo" 20 of FIG. 4 (i.e., seismic, electromagnetic, gravity, and pressure measurements 22 of FIG. 4) are 'integrated together' (an example of which is shown in FIG. 5), or when all the possible combinations of these 'four deep measurements' (that is, two and three of these measurements at a time and also all four of these measurements) are 'integrated together' in a joint interpretation/inversion, or when all the possible combinations of these 'four deep measurements' (that is, two and three of these measurements at a time and also all four of these measurements) are 'integrated together' with other measurements, such as near-wellbore WL and LWD, the 'four deep measurements' which comprise the "deep-reading quad-combo" 20 of FIG. 4 will provide considerable value and significant differentiation. As a result, when the Reservoir simulators 14 of FIG. 1 receive, as an input, the 'integrated set of deep reading quad combo suite of measurements' (i.e., the 'integrated' combination of seismic measurements, electromagnetic measurements, gravity measurements, and pressure measurements 22 of FIG. 4 and as specifically noted by example by numerals 24, 26, 28, and 30 of FIG. 5), the Reservoir simulators 14 of FIG. 1 will now allow the simulations to deterministically and accurately predict the future evolution of the reservoir, as noted by numeral 18 of FIG. 2.

The computer system of FIG. 13 receives the deep reading quad combo suite of measurements 20 and, responsive thereto, the processor 42a will build the reservoir model 12. The reservoir model 12 is input to the reservoir simulator 14. The processor 42a will execute the reservoir simulator 14 and, responsive thereto, it will generate the predictive or forward model 16. The predictive or forward model can be recorded or displayed on the recorder or display device 42d. As noted earlier, since the 'four deep measurements' which comprise the "deep-reading quad-combo" 20 of FIG. 4 [i.e., the 'integrated' combination of seismic, electromagnetic, gravity, and pressure measurements 22 of FIG. 4—that is, all possible combinations of these 'four deep measurements' (two and three of these measurements at a time and also all four of these measurements)] are 'integrated together', and perhaps since they are 'integrated together' with other measurements, such as near-wellbore WL and LWD, when the processor 42a receives, as an input, the 'integrated set of deep reading quad combo suite of measurements' 20, the Reservoir simulators 14 of FIG. 1 will now deterministically and accurately predict the future evolution of the reservoir, as noted by numeral 18 of FIG. 2.

Referring to FIGS. 14 through 20, a discussion of a "Method for Upscaling a Reservoir Model Using Deep Reading Measurements", as disclosed in this specification, is set forth in the following paragraphs with reference to FIGS. 14 through 20 of the drawings.

In FIG. 14, the computer system 42 of FIG. 13 is illustrated again; however, in FIG. 14, a 'software' 44 is stored in the memory 42c and is interposed between the reservoir simulator 14 and the predictive or forward model 16, the 'software' 44 being a 'Software adapted for constraining the Reservoir Simulator using Multi-well data and Deep Reading Measurements' 44. In FIG. 14, the computer system 42 is responsive to another set of 'input data', where that 'input data' includes 'Multi-well Data' 46 and 'Deep Reading Measurements' 48. In FIG. 14, the computer system 42 of FIG. 14 receives the multi-well data 46 and the deep reading measurements 48 and, responsive thereto, the processor 42a builds the reservoir model 12. The reservoir model 12 is input to the reservoir simulator 14. The reservoir simulator 14 is 'constrained' by the 'Software' 44 of FIG. 14 (i.e., by the 'Software adapted for constraining the Reservoir Simulator using Multi-well data and Deep Reading Measurements' 44 of FIG. 14) because the 'Software' 44 uses the multi-well data 46 and the deep reading measurements 48. The processor 42a will execute the 'constrained' reservoir simulator 14 and, responsive thereto, the processor 42a will generate the predictive or forward model 16 which can predict the future evolution of the reservoir (as noted by 18 in FIG. 2). The predictive or forward model 16 can then be recorded or displayed on the recorder or display device 42d.

In FIG. 14, the 'deep reading measurements' 48 include an 'integrated combination' of a plurality of (i.e., two or more of) the measurements illustrated in FIG. 20. That is, recalling that the term "EM" means 'Electromagnetic', the 'deep reading measurements' 48 of FIG. 14 include an 'integrated combination' of two or more of the following measurements (illustrated in FIG. 20): (1) long-offset single-well measurements [i.e., Electromagnetic (EM), sonic/seismic, gravity]; (2) cross-well (EM and seismic); (3) surface Electromagnetic (EM): Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround Vertical Seismic Profiling (VSP); (7) transient pressure and multi-well interference testing; (8) electrokinetics: electro-seismic and seismo-electric; (9) permanent monitoring (EM, pressure, seismic); and (10) borehole radar and sonar.

When the 'deep reading measurements' 48 of FIG. 14 (which comprise the 'integrated combination' of two or more of the measurements illustrated in FIG. 20) are 'integrated together', and when the processor 42a receives, as an input, the aforementioned 'integrated combination of the deep reading measurements' illustrated in FIG. 20, the Reservoir simulator 14 of FIG. 14 can now deterministically and accurately predict the future evolution of the reservoir.

In particular, the 'deep reading measurements' 48 of FIG. 14 include an 'integrated combination' of two of the following measurements (illustrated in FIG. 20): (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar.

In addition, the 'deep reading measurements' 48 of FIG. 14 include an 'integrated combination' of three of the following measurements (illustrated in FIG. 20): (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar.

In addition, the 'deep reading measurements' 48 of FIG. 14 include an 'integrated combination' of four of the following measurements (illustrated in FIG. 20): (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar.

In addition, the 'deep reading measurements' 48 of FIG. 14 include an 'integrated combination' of five of the following measurements (illustrated in FIG. 20): (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar.

In addition, the 'deep reading measurements' 48 of FIG. 14 include an 'integrated combination' of six of the following measurements (illustrated in FIG. 20): (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar.

In addition, the 'deep reading measurements' 48 of FIG. 14 include an 'integrated combination' of seven of the following measurements (illustrated in FIG. 20): (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar.

In addition, the 'deep reading measurements' 48 of FIG. 14 include an 'integrated combination' of eight of the following measurements (illustrated in FIG. 20): (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar.

In addition, the 'deep reading measurements' 48 of FIG. 14 include an 'integrated combination' of nine of the following measurements (illustrated in FIG. 20): (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar.

In addition, the 'deep reading measurements' 48 of FIG. 14 include an 'integrated combination' of all ten of the following measurements (illustrated in FIG. 20): (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar.

In FIG. 15, a software workflow 50 is illustrated, wherein the workflow 50 of FIG. 15 is set forth U.S. Pat. No. 6,662,109 to Roggero et al issued on Dec. 9, 2003 (hereinafter, the 'Roggero patent'), corresponding to U.S. Patent Application Publication 2003/0028325 A1 to Ruggero et al, published on Feb. 6, 2003, and entitled "Method of Constraining By Dynamic Production Data a Fine Model Representative of the Distribution in the Reservoir of a Physical Quantity Characteristic of the Subsoil Structure", the disclosure of which has already been incorporated by reference into the specification of this application.

In FIG. 15, the software workflow 50 of FIG. 15 includes the following steps: an 'Initial Geostatistical Selection Fine Geostatistical Model' step 52 which is followed by an 'Upscaling for Reservoir Simulation' step 50a. The 'Upscaling for Reservoir Simulation' step 50a includes the following steps: (1) an 'Upscaling Process' step 54; (2) a 'Simulation Model Initialization' step 55; (3) a 'Flow Simulation' step 56; (4) an 'Objective Function' step 58; (5) a 'Dynamic Data' step 64; (6) an 'Optimization Algorithm' step 60; and (7) a 'Simulation Model Updating' step 62. In FIG. 15, the software workflow 50 functions to practice a method which is intended for direct updating, by dynamic production data, of a fine geologic model representative of the distribution, in a reservoir, of a physical quantity characteristic of the subsoil structure. The method of workflow 50 is based on the coupling of 'inversion' and 'upscaling' techniques allowing to optimize petrophysical parameters of a rougher simulation model resulting from the fine geologic model. It comprises direct parameterization of the fine geologic model, upscaling being only a means of obtaining rapidly an approximation of the simulation results and of their derivatives in relation to the parameterization of the fine geologic model. In FIG. 15, numerical simulations of flow models are widely used in the petroleum industry to develop a reservoir and to predict its dynamic behaviour according to the various production scenarios. The 'geostatistical models' 52 of FIG. 15, used to represent the geologic structure of the reservoir (permeability, porosity, etc.), require a discretization consisting of a large number of grid cells that can reach about ten millions. To be able to carry out numerical flow simulations with reasonable computing times, common practice consists in constructing a rough simulation model by grouping together grids with different properties and by assigning to the macrogrids an equivalent property calculated from the local properties. This operation is referred to as 'upscaling' 54 of FIG. 15. The aim of 'constrained' reservoir characterization is to determine the parameters of the simulation model so that the latter can reproduce the production data of the reservoir to be modelled. This parameter estimation stage is also referred to as production data fitting. The flow simulation model 56 of FIG. 15 is thus compatible with all of the available static and dynamic data. In common practice, the parameters of the simulation model 56 are estimated by means of a series of trials and errors using the flow simulator. The problem of production data fitting can also be formulated as a problem of minimizing an 'objective function' 58 of FIG. 15 comprising the step of: measuring the difference between the 'production data' or 'dynamic data' 64 of FIG. 15 which has been observed in the field and the predictions provided by the flow simulator 56. Minimizing the 'objective function' 58 is then carried out using optimization or optimum control techniques 60 of FIG. 15. A method of predicting, by means of an 'Inversion Technique', the evolution of the production of an underground reservoir, notably of a reservoir containing hydrocarbons, is for example described in U.S. Pat. No. 5,764,515, the disclosure of which is incorporated by reference into the specification of this application. The parameters of the simulation model are 'adjusted' in a 'simulation model updating' step 62 of FIG. 15. As soon as the parameters of the simulation model are 'adjusted' in the 'simulation model updating' step 62 of FIG. 15, the resultant 'adjusted simulation model' can then be used to simulate the present and future behavior of the reservoir. An evaluation of the in-situ reserves is thus available and a development scheme optimizing the production can be determined. The aforementioned "Constrained" reservoir characterization thus involves multiple techniques, from 'geostatistical modelling' to 'optimization problems'.

However, in FIG. 15, the software workflow 50 includes a 'geostatistical' step 52 (i.e., "Initial Geostatistical selection fine geostatistical model") to propagate the multi-well data into the reservoir at the scale of the well logs, followed by an 'upscaling' step 54. The 'geostatistical' step 52 involves 'geo-statistical modeling'. 'Geostatistics', in its probabilistic presentation, implies that a spatial variable, such as the permeability for example, can be interpreted as a particular realization of a random function, defined by its probability law at any point in space. The increasingly common use of 'geostatistics', by oil companies, leads to the construction of fine models that can reach a large number of grid cells. In fact, 'geostatistics' allows to estimate petrophysical properties in space from local measurements. Strictly speaking, realization of the 'geostatistical model' has to be carried out on the scale of the measurement support, and the model thus obtained can then reach several million grid cells. Numerical flow simulation on the scale of the 'geostatistical model' is not conceivable with the power of current computers. In order to reduce the number of grids, they have to be grouped together, which requires computation of the equivalent properties of the new grids as a function of the properties of the small-scale grids, an operation which is referred to as 'upscaling'.

Recall, from a previous discussion set forth above, that the current practice in 'reservoir characterization' involves using 'near-wellbore logs' (e.g., Wireline, Logging While Drilling or LWD, etc.) and 'petrophysical models' (such as in 'ELAN') to estimate the static (and some dynamic) properties of the reservoir (e.g., porosity, saturation, mineralogy, etc.). These logs determine these properties (up to a radial depth of 10 ft or so away from the well) on a scale that is determined by their resolution, which can vary anywhere from few inches to few feet. However, not all such features will have an impact on a reservoir model that is on the scale of a flow unit which is usually on the order of 10's if not 100's of meters corresponding to the size of an 'Eclipse' flow grid. The issue, therefore, is: 'how to perform the upscaling'. For example, a thin bed detected by the 'Array Dynamic Tester (ADT)', with a depth of investigation of several inches, or even the '3D-Array Induction Tool (AIT)', with a depth of investigation of several feet, will have no impact on this 'upscaling' process unless we know that this thin layer extends sufficiently deep into the reservoir and, moreover, is either a permeability barrier (i.e., a very low permeability barrier that obstructs the flow) or a very high permeability streak (a super-k) in order to have a significant effect on flow.

Recall also that, presently, a step called 'geostatistics' (step 52 of FIG. 15) functions to both average the near-wellbore data at a coarser scale and then interpolate these data between wells. This 'geostatistical approach' (step 52 of FIG. 15) assumes that little variation occurs in the reservoir away from wells where data are available and this results in a poor estimate more often than we realize.

Therefore, instead of (and/or in addition to) using the above referenced 'geostatistics' step (52 of FIG. 15) to perform an 'upscaling process', recall that this specification discloses the use of the 'deep reading measurements' 48 of FIG. 14 to perform the 'upscaling process' (where the 'deep reading measurements' 48 include an 'integrated combination' of 'two or more' of the measurements illustrated in FIG. 20). An important potential use of the 'deep reading measurements' 48, as disclosed in this specification, involves performing the above referenced 'upscaling process' in a manner which is different from the 'geostatistical approach', as follows: the 'upscaling process' is performed, by the 'deep reading measurements' 48, "from the near-wellbore multi-well data to the scale of the reservoir". The 'deep reading measurements' 48 can provide formation delineation on a distance scale (for both coverage and resolution) that is somewhere between near-wellbore logs and surface seismic.

Recalling that the 'deep reading measurements' 48 of FIG. 14 include an 'integrated combination' of 'two or more' of the measurements illustrated in FIG. 20, the use of these 'deep reading measurements' 48 of FIG. 14 can be an alternative to the 'geostatistics' step 52 of FIG. 15 when performing the 'upscaling process', or the 'deep reading measurements' 48 of FIG. 14 can be complementary to the 'geostatistics' step 52 of FIG. 15 when performing the 'upscaling process'. The 'deep reading' suite of 'measurements' 48 required for this 'upscaling process' are the 'deep' ones as well as (or in addition to) the 'near-wellbore logs' (e.g., cores, LWD, wireline, permanent sensing).

Figure 16:
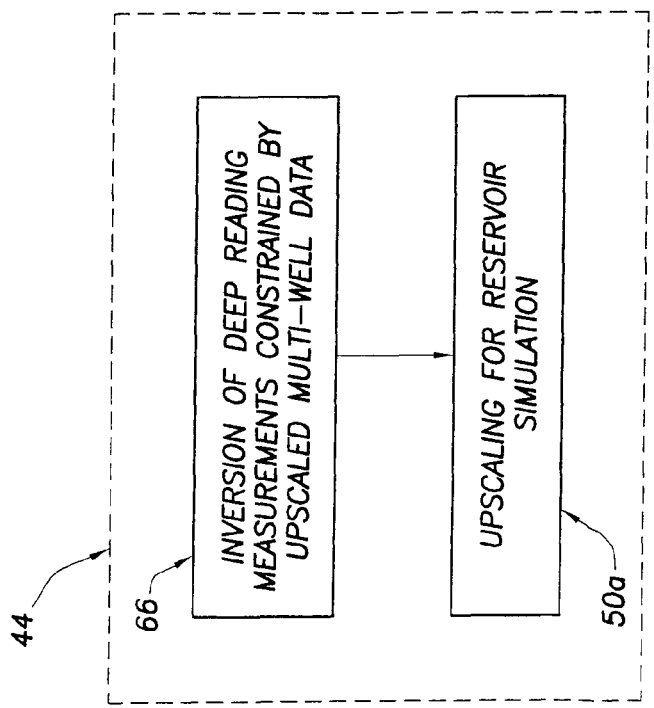
Figure 17:
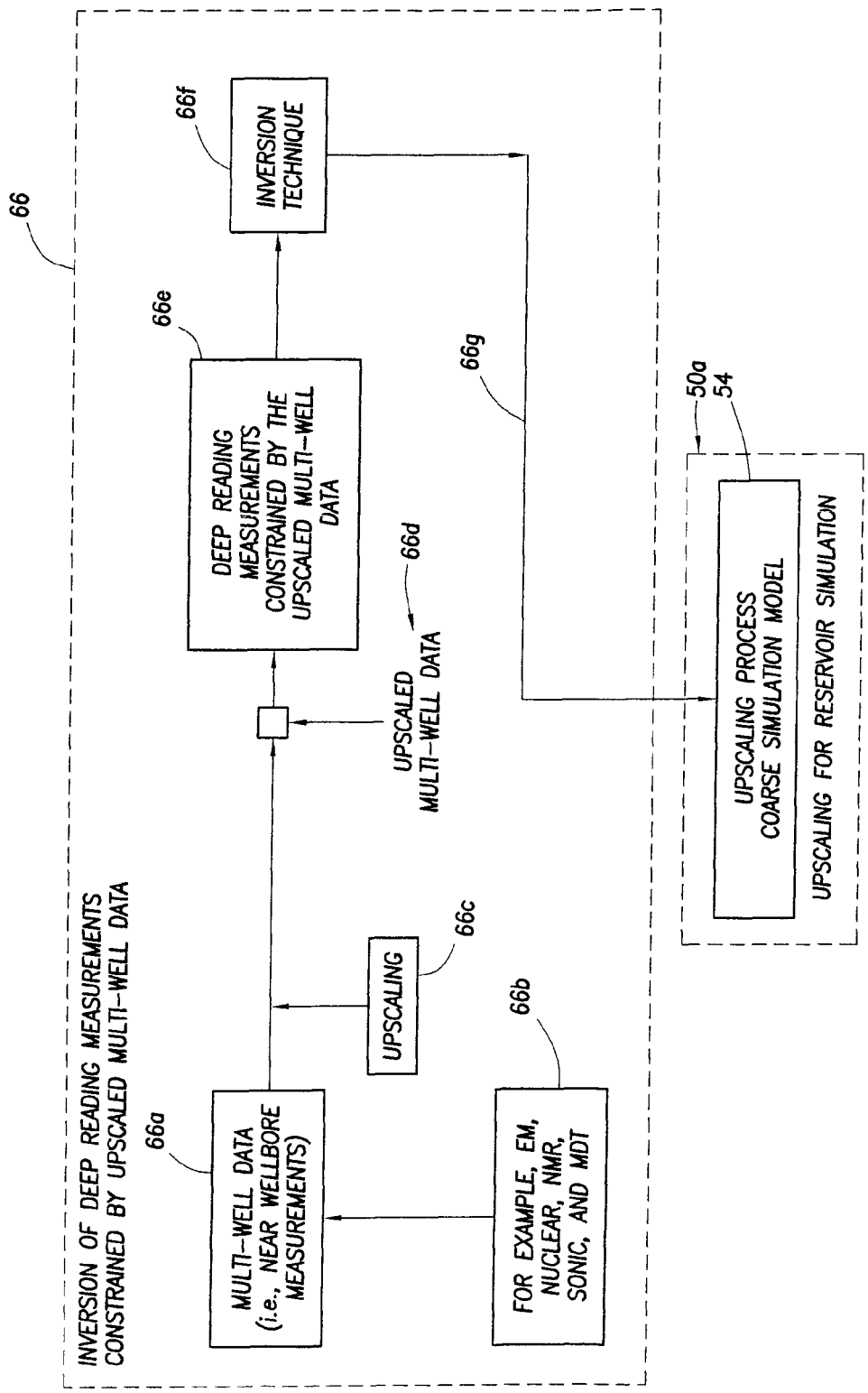

In FIGS. 16 and 17, a first embodiment of the 'Software adapted for constraining the Reservoir Simulator using Multi-well data and Deep Reading Measurements' 44 of FIG. 14, which is adapted for practicing an 'upscaling process', is illustrated. The first embodiment of the 'Software' 44 of FIG. 14, illustrated in FIGS. 16 and 17, uses the 'integrated combination' of 'two or more' of the 'deep reading measurements' illustrated in FIG. 20, instead of the 'geostatistics' step 52, when performing the 'upscaling process'. Recall that the above referenced 'upscaling process' is performed by using the 'deep reading measurements' 48 of FIG. 14: "from the near-wellbore multi-well data to the scale of the reservoir".

In FIG. 15, recall that the software workflow 50 disclosed in the 'Roggero patent' includes a 'geostatistical' step 52 (i.e., "Initial Geostatistical selection fine geostatistical model") that is designed to 'propagate the multi-well data into the reservoir at the scale of the well logs', which is followed by the 'Upscaling for Reservoir Simulation' step 50a.

In FIG. 16, on the other hand, the 'first embodiment' of the 'Software adapted for constraining the Reservoir Simulator using Multi-well data and Deep Reading Measurements' 44 of FIG. 14 disclosed in this specification uses the 'integrated combination' of 'two or more' of the 'deep reading measurements' illustrated in FIG. 20 to perform the 'upscaling process', wherein the 'upscaling process' (practiced by using the 'deep reading measurements' 48 of FIG. 14) is performed: "from the near-wellbore multi-well data to the scale of the reservoir". In FIG. 16, the 'first embodiment' of the 'Software adapted for constraining the Reservoir Simulator using Multi-well data and Deep Reading Measurements' 44 of FIG. 14 represents an 'alternative to' the use of the above referenced 'Geostatistics' step 52 of FIG. 15 (hereinafter, the 'Geostatistical Approach'). That is, since the 'first embodiment' of the 'Software adapted for constraining the Reservoir Simulator using Multi-well data and Deep Reading Measurements' 44 of FIG. 14, illustrated in FIGS. 16 and 17, represents an 'alternative to' the 'Geostatistical Approach' of FIG. 15, instead of starting with the 'Geostatistics' step 52 of FIG. 15, in FIG. 16, we start with a first step involving the 'Inversion of the deep reading measurements constrained by the upscaled multi-well data', as noted below. To be more specific, in FIG. 16, instead of using the 'Geostatistical Approach' of FIG. 15, which includes the 'Geostatistics' step 52, the 'first embodiment' of the 'Software adapted for constraining the Reservoir Simulator using Multi-well data and Deep Reading Measurements' 44 of FIG. 14 illustrated in FIG. 16 includes a first step 66 entitled: 'Inversion of Deep Reading Measurements Constrained by Upscaled Multi-well Data'. In step 66 of FIG. 16, we invert the deep reading measurements constrained by the upscaled multi-well data. In FIG. 16, the 'Inversion of Deep Reading Measurements Constrained by Upscaled Multi-well Data' step 66 is then followed by the 'Upscaling for Reservoir Simulation' step 50a of FIG. 15.

In FIG. 17, a more detailed construction of the 'Inversion of Deep Reading Measurements Constrained by Upscaled Multi-well Data' step 66 of FIG. 16 is illustrated. In FIG. 17, the 'Inversion of Deep Reading Measurements Constrained by Upscaled Multi-well Data' step 66 of FIG. 16 includes the following steps.

In FIG. 17, we start with 'multi-well data' 66a, such as 'near wellbore measurements', 66a, which may include, by way of example, Electromagnetic (EM) data, Nuclear data, Nuclear Magnetic Resonance (NMR) data, Sonic data, and Modular Dynamic Tester (MDT) data, as indicated by block 66b of FIG. 17. This data may be acquired by using the products and services of Schlumberger Technology Corporation, of Houston, Tex.

In FIG. 17, the above referenced 'multi-well data' 66a is then 'upscaled' in an 'upscaling' step 66c of FIG. 17, thereby generating a set of 'upscaled multi-well data' 66d. In the 'upscaling' step 66c of FIG. 17, recall that 'geological models' are used to represent the geologic structure of the reservoir (permeability, porosity, etc.), and such models require a discretization consisting of a large number of grid cells that can reach about ten millions. To be able to carry out numerical flow simulations with reasonable computing times, common practice consists in constructing a 'rough' simulation model by grouping together grids with different properties and by assigning to the macrogrids an equivalent property calculated from the local properties. This operation is referred to as 'upscaling', which is part of an 'overall operation' known as "constrained reservoir characterization". The aim of this "constrained reservoir characterization" is to determine the parameters of the simulation model so that the latter can reproduce the production data of the reservoir to be modelled.

In FIG. 17, a step 66e (entitled 'Deep Reading Measurements constrained by the upscaled multi-well data' 66e) receives the 'upscaled multi-well data' 66d. In step 66e, a set of 'deep reading measurements' are 'constrained by' the 'upscaled multi-well data'. The 'deep reading measurements' of step 66e in FIG. 17 will be discussed in more detail later in this specification. However, recall from FIG. 14 that the 'deep reading measurements' 48 include an 'integrated combination' of 'two or more' of the measurements illustrated in FIG. 20—that is, any and all possible combinations of 'two or more' of the measurements illustrated in FIG. 20. For example, the 'deep reading measurements' of step 48 of FIG. 14 and step 66e of FIG. 17 include an 'integrated combination' of 'two or more' of the measurements illustrated in FIG. 20. That is, the 'deep reading measurements' of step 48 of FIG. 14 and step 66e of FIG. 17 include combinations of 'two or more' of the following measurements (illustrated in FIG. 20): (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar.

In FIG. 17, the 'deep reading measurements constrained by the upscaled multi-well data' of step 66e are then 'inverted' or 'history matched' in an 'Inversion Technique' step 66f. The method or technique known as 'inversion' is also known, by specialists, as 'history matching'. An 'Inversion Technique' can be found in U.S. Pat. No. 5,764,515 to Guerillot et al entitled 'method of predicting by means of an inversion technique the evolution of the production of an underground reservoir', the disclosure of which has already been incorporated by reference into this specification. 'Inversion techniques', such as the 'Inversion Technique' 66f of FIG. 17 and the 'Inversion Technique' discussed in U.S. Pat. No. 5,764,515 to Guerillot et al, are extensively used in the field of reservoir engineering. The following usual fields of application can be cited by way of example: At the laboratory stage, they are used to determine various parameters representative of the behaviour of rocks in relation to fluids. These parameters can be, for example: the absolute and relative permeability, capillarity curves, etc. 'Inversion techniques' are also commonly used to interpret well tests. The inversion parameters are then, for example, the permeability of one or several facies, the geometrical limits of a geologic structure, the coefficients borne by the productivity index of a well, etc. To survey a reservoir, inversion is used to match the response of a numerical simulator with available production measurements (or "production history"). The parameters can be, for example, the porosity of the rocks, the absolute and relative permeabilities thereof, the productivity indices of the wells, etc. In connection with a 'Technique of Matching the Production History of a Reservoir', 'Inversion techniques' include a process of matching a production history by adjusting the parameters of a simulation model. As a result, the term "Inversion" is also referred to by specialists as "History Matching".

It notably consists in finding a set of parameters governing the fluid flow equations which, integrated in a numerical simulator, allow the data observed or indicated to be found again. To construct the initial model, all the available information is incorporated therein: raw or interpreted data, geological surveys, seismic measurements, etc. The physical knowledge of a reservoir can be integrated by considering for example: the structure of the sedimentologic units; the variation limits of the petrophysical values (porosity, permeabilities, etc) associated with the lithofacies, and the statistical information relative to the mean values, the standard deviations, the spatial correlation, etc. The process known as 'history matching' conventionally comprises the stages as follows: (a) A simulation model is constructed on the basis of the initial geologic knowledge and by integrating as many available data as possible; (b) Significant parameters of the model are selected for the inversion process by considering: the knowledge of the reservoir behaviour as a function of these parameters, their qualitative influence on production, the initial uncertainties associated with these parameters; (c) Adjustment with the model parameters is achieved in order to reproduce the production history or the data observed. A set of parameter values being given, direct simulation allows the expected results to be compared with the observations. The most commonly used method is a trial-and-error procedure is where the reservoir engineer's experience comes into play: the values of the parameters are adjusted as a function of the knowledge of the reservoir and of the understanding of the dynamic behavior thereof.

In FIG. 17, the output 66g generated from the 'Inversion Technique' step 66f of FIG. 17 may be described as including: 'Inverted deep reading measurements constrained by the upscaled multi-well data', the output 66g being introduced to the 'upscaling process coarse simulation model' step 54 associated with the 'Upscaling for Reservoir Simulation' step 50a of FIGS. 15 and 17.

Figure 18:
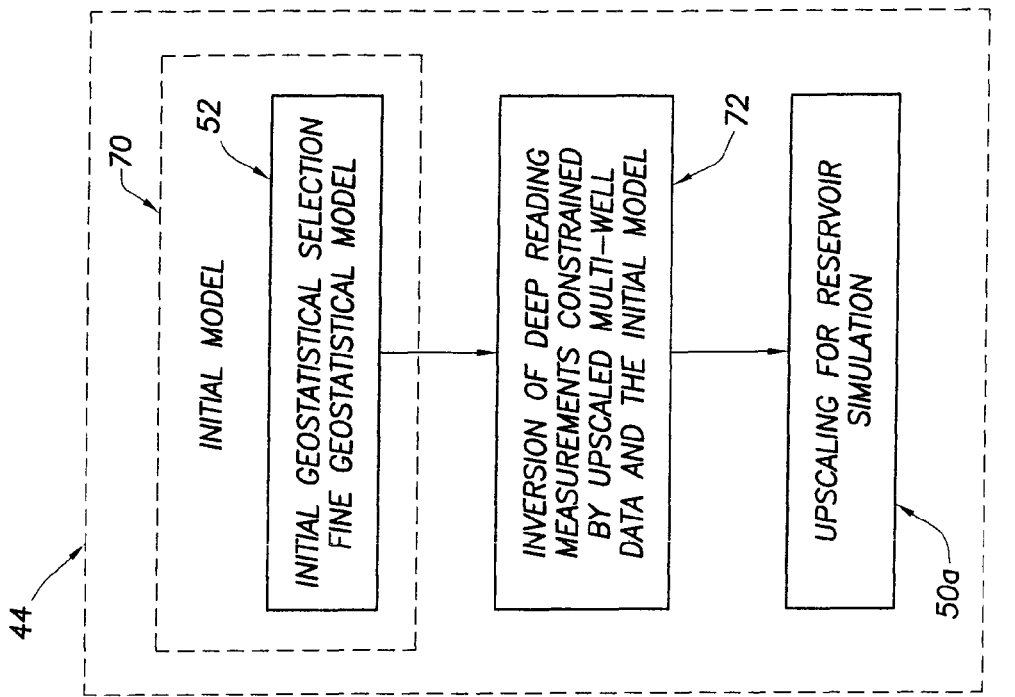
Figure 19:
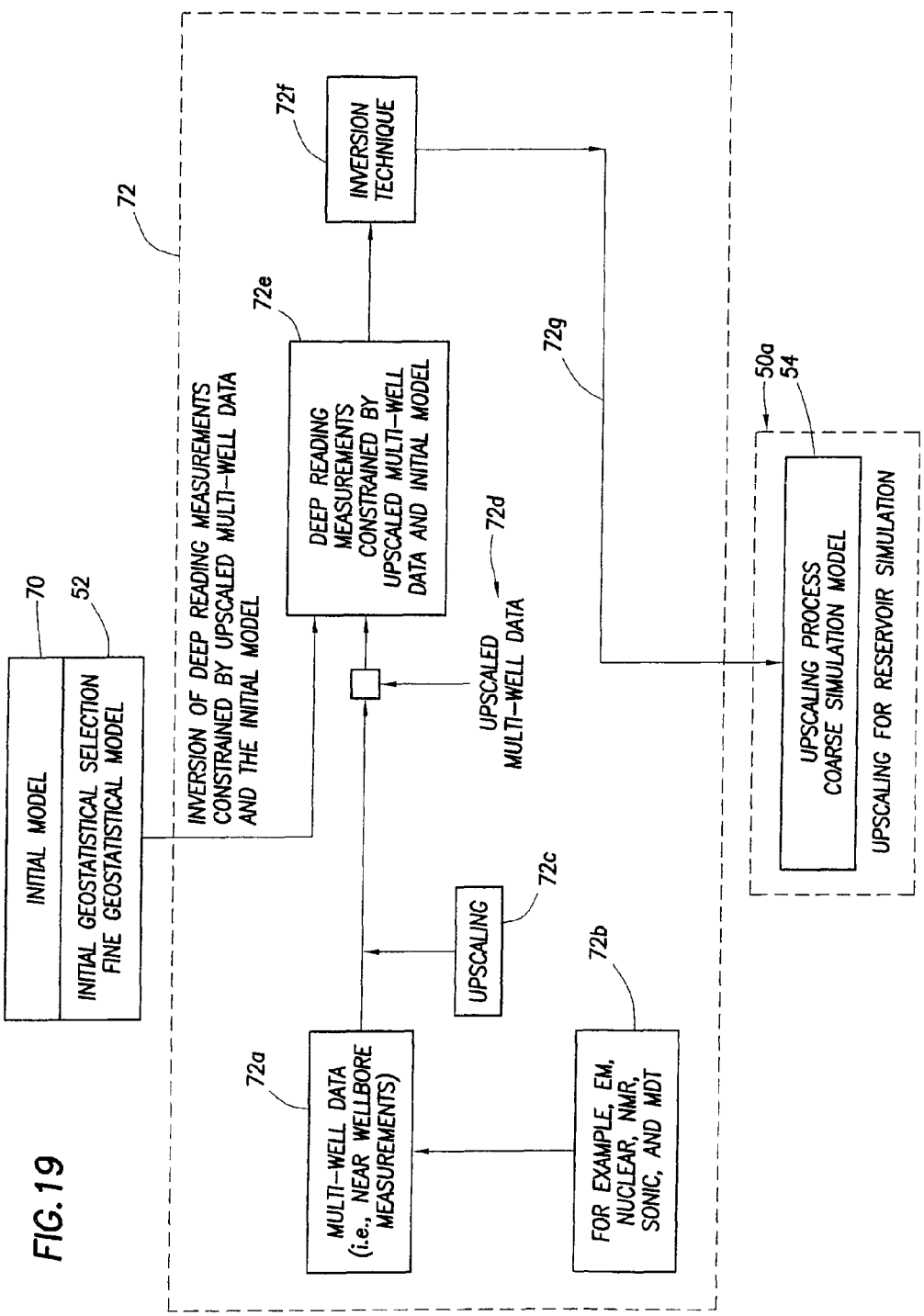

In FIGS. 18 and 19, a 'second embodiment' of the 'Software adapted for constraining the Reservoir Simulator using Multi-well data and Deep Reading Measurements' 44 of FIG. 14, which is adapted for practicing an 'upscaling process', is illustrated. The 'second embodiment' of the 'Software' 44 of FIG. 14, illustrated in FIGS. 18 and 19, also uses the 'integrated combination' of 'two or more' of the 'deep reading measurements' illustrated in FIG. 20 to perform the 'upscaling process', wherein the 'upscaling process' (practiced by using the 'deep reading measurements' 48 of FIG. 14) is performed: "from the near-wellbore multi-well data to the scale of the reservoir". However, the 'second embodiment' of FIGS. 18 and 19 is a 'compliment to' (and not an alternative to) the above referenced 'Geostatistical Approach' (which includes the 'Geostatistics' step 52 of FIG. 15).

In FIG. 18, since the 'second embodiment' of the 'Software adapted for constraining the Reservoir Simulator using Multi-well data and Deep Reading Measurements' 44 of FIG. 14, as illustrated in FIGS. 18 and 19, is a 'compliment to' the 'Geostatistical Approach', in FIG. 18, we start with the 'Geostatistics' step 52 of FIG. 15, entitled 'Initial Geostatistical Selection Fine Geostatistical Model' step 52 of FIG. 15, which represents the 'Geostatistical Approach', as an 'Initial Model' 70. The 'Initial Model' 70 is then input to a step entitled 'Inversion of the deep reading measurements constrained by the upscaled multi-well data and the initial model', step 72 of FIG. 18. In FIG. 18, the 'Inversion of the deep reading measurements constrained by the upscaled multi-well data and the initial model' step 72 of FIG. 18 is then input to the 'Upscaling for Reservoir Simulation' step 50a of FIG. 15.

In FIG. 19, a detailed construction of the 'Inversion of the deep reading measurements constrained by the upscaled multi-well data and the initial model' step 72 of FIG. 18 is illustrated. In FIG. 19, the 'Inversion of Deep Reading Measurements Constrained by Upscaled Multi-well Data and the Initial Model' step 72 of FIG. 18 includes the following steps.

In FIG. 19, we start with 'multi-well data' 72a, such as 'near wellbore measurements', 72a, which may include, by way of example, Electromagnetic (EM) data, Nuclear data, Nuclear Magnetic Resonance (NMR) data, Sonic data, and Modular Dynamic Tester (MDT) data, as indicated by block 72b of FIG. 19. This data may be acquired by using the products and services of Schlumberger Technology Corporation, of Houston, Tex.

In FIG. 19, the above referenced 'multi-well data' 72a is then 'upscaled' in an 'upscaling' step 72c of FIG. 19, thereby generating a set of 'upscaled multi-well data' 72d. In the 'upscaling' step 72c of FIG. 19, recall that 'geological models' are used to represent the geologic structure of the reservoir (permeability, porosity, etc.), and such models require a discretization consisting of a large number of grid cells that can reach about ten millions. To be able to carry out numerical flow simulations with reasonable computing times, common practice consists in constructing a 'rough' simulation model by grouping together grids with different properties and by assigning to the macrogrids an equivalent property calculated from the local properties. This operation is referred to as 'upscaling', which is part of an 'overall operation' known as "constrained reservoir characterization". The aim of this "constrained reservoir characterization" is to determine the parameters of the simulation model so that the latter can reproduce the production data of the reservoir to be modelled. In FIG. 19, a step 72e (entitled 'Deep Reading Measurements constrained by the upscaled multi-well data and the Initial Model' 72e) receives the 'upscaled multi-well data' 72d and the 'Initial Model' 70 which includes the 'Geostatistics' step 52 of FIG. 15, entitled 'Initial Geostatistical Selection Fine Geostatistical Model' 52. In step 72e, a set of 'deep reading measurements' are 'constrained by' the 'upscaled multi-well data' 72d and by the 'initial model' 70 which includes the 'Geostatistics' step 52. The 'deep reading measurements' are illustrated in FIG. 20 and will be discussed in more detail later in this specification. However, recall from FIG. 14 that the 'deep reading measurements' 48 include an 'integrated combination' of 'two or more' of the measurements illustrated in FIG. 20—that is, any and all possible combinations of 'two or more' of the measurements illustrated in FIG. 20. For example, the 'deep reading measurements' 48 of FIG. 14 include an 'integrated combination' of two or more of the measurements illustrated in FIG. 20. That is, the 'deep reading measurements' 48 of FIG. 14 include combinations of 'two or more' of the following measurements (illustrated in FIG. 20): (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar. In FIG. 19, the 'deep reading measurements constrained by the upscaled multi-well data and the initial model' of step 72e are then 'inverted' or 'history matched' in an 'Inversion Technique' step 72f. The method or technique known as 'inversion' is also known, by specialists, as 'history matching'. An 'Inversion Technique' can be found in U.S. Pat. No. 5,764,515 to Guerillot et al entitled 'method of predicting by means of an inversion technique the evolution of the production of an underground reservoir', the disclosure of which has already been incorporated by reference into this specification. The 'Inversion Technique' step 72f of FIG. 19 is the same step as the 'Inversion Technique' step 66f of FIG. 17. In FIG. 19, the output 72g generated from the 'Inversion Technique' step 72f of FIG. 19 may be described as including: 'Inverted deep reading measurements constrained by the upscaled multi-well data and the initial model', the output 72g being input to the 'Upscaling process coarse simulation model' step 54 associated with the 'Upscaling for Reservoir Simulation' step 50a of FIG. 15.

In FIG. 20, a detailed construction of each of the individual 'deep reading measurements' of step 66e of FIG. 17 and step 72e of FIG. 19 is illustrated. Step 66e of FIG. 17 entitled 'Deep Reading Measurements constrained by the upscaled multi-well data' and step 72e of FIG. 19 entitled 'Deep Reading Measurements constrained by the upscaled multi-well data and the Initial Model' each use the term 'deep reading measurements'. However, that term 'deep reading measurements' in steps 66e and 72e actually refers to and identifies an 'integrated combination' of 'two or more' of the measurements illustrated in FIG. 20—that is, any and all possible combinations of 'two or more' of the measurements illustrated in FIG. 20. In FIG. 20, the 'deep reading measurements' include a combination of two or more of: (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar.

Therefore, the term 'deep reading measurements', which is used in step 66e of FIG. 17 and step 72e in FIG. 19, actually refers to an 'integrated combination' of 'two or more' of the following measurements illustrated in FIG. 20: (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar.

As a result, in FIG. 17, the term 'deep reading measurements' in step 66e of FIG. 17 entitled 'deep reading measurements constrained by the upscaled multi-well data' actually refers to an 'integrated combination' of 'two or more' of the following measurements illustrated in FIG. 20 which are also constrained by the upscaled multi-well data 66d of FIG. 17: (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar.

In addition, in FIG. 19, the term 'deep reading measurements' in step 72e of FIG. 19 entitled 'deep reading measurements constrained by the upscaled multi-well data and initial model' actually refers to an 'integrated combination' of 'two or more' of the following measurements illustrated in FIG. 20 which are also constrained by the upscaled multi-well data 72d and the initial model 70 (which includes the Geostatistics step 52) of FIG. 19: (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar.

Recall, again, that the 'deep reading measurements' step 48 of FIG. 14 and step 66e of FIG. 17 and step 72e of FIG. 19 include an 'integrated combination' of two of the following measurements (illustrated in FIG. 20): (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar.

In addition, recall that the 'deep reading measurements' step 48 of FIG. 14 and step 66e of FIG. 17 and step 72e of FIG. 19 include an 'integrated combination' of three of the following measurements (illustrated in FIG. 20): (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar.

In addition, recall that the 'deep reading measurements' step 48 of FIG. 14 and step 66e of FIG. 17 and step 72e of FIG. 19 include an 'integrated combination' of four of the following measurements (illustrated in FIG. 20): (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar.

In addition, recall that the 'deep reading measurements' step 48 of FIG. 14 and step 66e of FIG. 17 and step 72e of FIG. 19 include an 'integrated combination' of five of the following measurements (illustrated in FIG. 20): (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar.

In addition, recall that the 'deep reading measurements' step 48 of FIG. 14 and step 66e of FIG. 17 and step 72e of FIG. 19 include an 'integrated combination' of six of the following measurements (illustrated in FIG. 20): (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar.

In addition, recall that the 'deep reading measurements' step 48 of FIG. 14 and step 66e of FIG. 17 and step 72e of FIG. 19 include an 'integrated combination' of seven of the following measurements (illustrated in FIG. 20): (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar.

In addition, recall that the 'deep reading measurements' step 48 of FIG. 14 and step 66e of FIG. 17 and step 72e of FIG. 19 include an 'integrated combination' of eight of the following measurements (illustrated in FIG. 20): (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar.

In addition, recall that the 'deep reading measurements' step 48 of FIG. 14 and step 66e of FIG. 17 and step 72e of FIG. 19 include an 'integrated combination' of nine of the following measurements (illustrated in FIG. 20): (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar.

In addition, recall that the 'deep reading measurements' step 48 of FIG. 14 and step 66e of FIG. 17 and step 72e of FIG. 19 include an 'integrated combination' of all ten of the following measurements (illustrated in FIG. 20): (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar.

A functional description of the operation of the computer system 42 of FIG. 14, and, in particular, a functional description of the 'Software adapted for constraining the reservoir simulator using multi-well data and deep reading measurements' 44 of FIG. 14 will be set forth in the following paragraphs with reference to FIGS. 14 through 20 of the drawings.

This specification discloses a 'method for reservoir upscaling using deep reading measurements'. When practicing an 'upscaling process' while using a simulation model to predict the production of oil and/or gas from a reservoir, a 'geostatistics' step was followed by an 'upscaling' step. This 'geostatistical approach' assumes that little variation occurs in the reservoir away from wells where data are available and this results in a poor estimate more often than we realize. However, when practicing the upscaling process, instead of using the 'geostatistics' step, this specification discloses using an 'Inversion of deep reading measurements constrained by upscaled multi-well data' step followed by the 'upscaling' step. In the alternative, when practicing the upscaling process, this specification also discloses using the 'geostatistics' step as an initial model followed by an 'Inversion of deep reading measurements constrained by upscaled multi-well data and an initial model' step followed by the 'upscaling' step. In either workflow, by doing this 'constrained inversion', one has honored the near-wellbore data, provided extra information on the inter-well space and, in the process, one has performed the upscaling based on physics and measurements rather than based on statistical averaging or interpolation only.

The computer system 42 of FIG. 14 receives the multi-well data 46 and the deep reading measurements 48 and, responsive thereto, the processor 42a will build the reservoir model 12. The reservoir model 12 is input to the reservoir simulator 14. A 'software' 44, adapted for constraining the reservoir simulator using the multi-well data and the deep reading measurements, will 'constrain' the reservoir simulator 14 in a 'particular manner'. The processor 42a will then execute the 'constrained' reservoir simulator 14 and, responsive thereto, it will generate the predictive or forward model 16. The predictive or forward model can be recorded or displayed on the recorder or display device 42d. The 'particular manner' by which the 'software' 44 of FIG. 14 will 'constrain' the reservoir simulator 14 will be discussed again in the following paragraphs.

In FIG. 15, the 'software' 44 of FIG. 14 was previously constructed in the manner illustrated in FIG. 15 of the drawings. In FIG. 15, a 'geostatistics' step 52 was used to both average the near-wellbore data at a coarser scale and then interpolate these data between wells. The 'geostatistics' step 52 implies that a spatial variable, such as permeability, can be interpreted as a particular realization of a random function defined by its probability law at any point in space. The 'geostatistics' step 52 along with the 'upscaling process' step 54 of FIG. 15 together practice an 'upscaling process' function. However, the use of the 'geostatistics' step 52 of FIG. 15 assumes that little variation occurs in the reservoir away from wells where data are available and this results in a poor estimate more often than we realize.

In a first embodiment of the 'method for upscaling a reservoir model using deep reading measurements' disclosed in this specification, in FIG. 16, instead of using the 'geostatistics' step 52 of FIG. 15, another step 66 replaces the 'geostatistics' step 52 of FIG. 15, the step 66 of FIG. 16 being entitled 'Inversion of deep reading measurements constrained by upscaled multi-well data'. In FIG. 17, the 'Inversion of deep reading measurements constrained by upscaled multi-well data' step 66 of FIGS. 16 and 17 along with the 'upscaling process' step 54 of FIG. 17 will, together, practice the 'upscaling process' function. As a result, the 'software adapted for constraining the reservoir simulator using the multi-well data and the deep reading measurements' 44 of FIG. 14 is now constructed in a first manner illustrated in FIGS. 16 and 17.

In FIG. 17, in the 'Inversion of deep reading measurements constrained by upscaled multi-well data' step 66 of FIG. 17, the 'deep reading measurements' of step 66e, which are constrained by the upscaled multi-well data 66d, are 'inverted' by the Inversion technique 66f thereby generating 'inverted deep reading measurements constrained by upscaled multi-well data' 66g. The term 'deep reading measurements' of step 66e in FIG. 17 actually refers to an 'integrated combination' of 'two or more' of the following measurements illustrated in FIG. 20 which are also constrained by the upscaled multi-well data 66d of FIG. 17: (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar. That is, the term 'deep reading measurements' of step 66e in FIG. 17 actually refers to an 'integrated combination' of two of the measurements illustrated in FIG. 20; and the term 'deep reading measurements' of step 66e in FIG. 17 actually refers to an 'integrated combination' of three of the measurements illustrated in FIG. 20; and the term 'deep reading measurements' of step 66e in FIG. 17 actually refers to an 'integrated combination' of four of the measurements illustrated in FIG. 20; and the term 'deep reading measurements' of step 66e in FIG. 17 actually refers to an 'integrated combination' of five of the measurements illustrated in FIG. 20; and the term 'deep reading measurements' of step 66e in FIG. 17 actually refers to an 'integrated combination' of six of the measurements illustrated in FIG. 20; and the term 'deep reading measurements' of step 66e in FIG. 17 actually refers to an 'integrated combination' of seven of the measurements illustrated in FIG. 20; and the term 'deep reading measurements' of step 66e in FIG. 17 actually refers to an 'integrated combination' of eight of the measurements illustrated in FIG. 20; and the term 'deep reading measurements' of step 66e in FIG. 17 actually refers to an 'integrated combination' of nine of the measurements illustrated in FIG. 20; and the term 'deep reading measurements' of step 66e in FIG. 17 actually refers to an 'integrated combination' of all ten of the measurements illustrated in FIG. 20.

In a second embodiment of the 'method for upscaling a reservoir model using deep reading measurements' disclosed in this specification, in FIG. 18, in addition to the 'geostatistics' step 52 of FIG. 15, another step 72 of FIG. 18 is used in addition to the 'geostatistics' step 52, the step 72 of FIG. 18 being entitled 'Inversion of deep reading measurements constrained by upscaled multi-well data and the initial model'. In FIG. 19, the 'geostatistics' step 52 of FIG. 15 and the 'Inversion of deep reading measurements constrained by upscaled multi-well data and the initial model' step 72 of FIG. 19 along with the 'upscaling process' step 54 of FIG. 19 will, together, practice the 'upscaling process' function. As a result, the 'software adapted for constraining the reservoir simulator using the multi-well data and the deep reading measurements' 44 of FIG. 14 is now constructed in a second manner illustrated in FIGS. 18 and 19.

In FIG. 19, in the 'Inversion of deep reading measurements constrained by upscaled multi-well data and the initial model' step 72, the 'deep reading measurements' of step 72e, which are constrained by the upscaled multi-well data 72d and the initial model 70 including the 'geostatistics' step 52, are 'inverted' by the Inversion technique 72f thereby generating 'inverted deep reading measurements constrained by upscaled multi-well data and the initial model' 72g. The term 'deep reading measurements' in step 72e of FIG. 19 actually refers to an 'integrated combination' of 'two or more' of the following measurements illustrated in FIG. 20, which are also constrained by the upscaled multi-well data 72d and the initial model 70 of FIG. 19: (1) long-offset single-well measurements (EM, sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround VSP; (7) transient pressure and multi-well interference testing; (8) electrokinetics: electro-seismic and seismo-electric; (9) permanent monitoring (EM, pressure, seismic); and (10) borehole radar and sonar.

That is, the term 'deep reading measurements' of step 72e in FIG. 19 actually refers to an 'integrated combination' of two of the measurements illustrated in FIG. 20; and the term 'deep reading measurements' of step 72e in FIG. 19 actually refers to an 'integrated combination' of three of the measurements illustrated in FIG. 20; and the term 'deep reading measurements' of step 72e in FIG. 19 actually refers to an 'integrated combination' of four of the measurements illustrated in FIG. 20; and the term 'deep reading measurements' of step 72e in FIG. 19 actually refers to an 'integrated combination' of five of the measurements illustrated in FIG. 20; and the term 'deep reading measurements' of step 72e in FIG. 19 actually refers to an 'integrated combination' of six of the measurements illustrated in FIG. 20; and the term 'deep reading measurements' of step 72e in FIG. 19 actually refers to an 'integrated combination' of seven of the measurements illustrated in FIG. 20; and the term 'deep reading measurements' of step 72e in FIG. 19 actually refers to an 'integrated combination' of eight of the measurements illustrated in FIG. 20; and the term 'deep reading measurements' of step 72e in FIG. 19 actually refers to an 'integrated combination' of nine of the measurements illustrated in FIG. 20; and the term 'deep reading measurements' of step 72e in FIG. 19 actually refers to an 'integrated combination' of all ten of the measurements illustrated in FIG. 20.

The above description of the 'Method for Upscaling a Reservoir Model using Deep Reading Measurements' being thus described, it will be obvious that the same may be varied in many ways. Such variations are not to be regarded as a departure from the spirit and scope of the claimed method or system or program storage device or computer program, and all such modifications as would be obvious to one skilled in the art are intended to be included within the scope of the following claims.

We claim:

1. A method of upscaling for reservoir simulation, comprising:
   collecting a plurality of deep reading measurements of a reservoir, wherein the plurality of deep reading measurements comprises gravity and pressure measurements;
   generating a set of deep reading measurements by integrally combining the plurality of deep reading measurements;
   constraining the set of deep reading measurements using upscaled multi-well near-wellbore data to generate a constrained set of deep reading measurements;
   inverting, using a computer processor, the constrained set of deep reading measurements to generate an inverted set of deep reading measurements; and
   in response to the inverting step, upscaling, using the inverted set of deep reading measurements, for reservoir simulation.

2. The method of claim 1, wherein inverting the set of deep reading measurements is further constrained by an initial model, generation of the initial model including a geostatistics step.

3. A non-transitory program storage device readable by a machine tangibly embodying a set of instructions executable by the machine to perform method steps of upscaling for reservoir simulation, the method steps comprising:
   collecting a plurality of deep reading measurements of a reservoir, wherein the plurality of deep reading measurements comprises gravity and pressure measurements;
   generating a set of deep reading measurements by integrally combining the plurality of deep reading measurements;
   constraining the set of deep reading measurements using upscaled multi-well near-wellbore data to generate a constrained set of deep reading measurements;
   inverting the constrained set of deep reading measurements to generate an inverted set of deep reading measurements; and
   in response to the inverting step, upscaling, using the inverted set of deep reading measurements, for reservoir simulation.

4. The non-transitory program storage device of claim 3, wherein inverting the set of deep reading measurements is further constrained by an initial model, generation of the initial model including a geostatistics step.

5. A system adapted for upscaling for reservoir simulation, comprising:
   a processor and a memory;
   first apparatus adapted for collecting a plurality of deep reading measurements of a reservoir, wherein the plurality of deep reading measurements comprises gravity and pressure measurements;
   second apparatus adapted for generating a set of deep reading measurements by integrally combining the plurality of deep reading measurements;
   third apparatus adapted for constraining the set of deep reading measurements using upscaled multi-well near-wellbore data to generate a constrained set of deep reading measurements;
   fourth apparatus adapted for inverting the constrained set of deep reading measurements to generate an inverted set of deep reading measurements; and
   in response to the fourth apparatus, fifth apparatus adapted for upscaling, using the inverted set of deep reading measurements, for reservoir simulation.

6. The system of claim 5, wherein inverting the set of deep reading measurements is further constrained by an initial model, generation of the initial model including a geostatistics step.

7. A method for upscaling a reservoir model, comprising:
   collecting a plurality of deep reading measurements of a reservoir, wherein the plurality of deep reading measurements comprises gravity and pressure measurements;

integrating together the plurality of deep reading measurements thereby generating a set of deep reading measurements, the set of deep reading measurements being sufficiently deep to be able to probe the reservoir;

generating a set of upscaled multi-well near-wellbore data;

constraining the set of the deep reading measurements using the upscaled multi-well near-wellbore data;

inverting, using a computer processor, the set of deep reading measurements constrained by the upscaled multi-well near-wellbore data thereby generating an inverted set of deep reading measurements constrained by the upscaled multi-well near-wellbore data; and upscaling, using the inverted set of deep reading measurements constrained by the upscaled multi-well near-wellbore data.

8. The method of claim 7, wherein the set of deep reading measurements includes a combination of two or more of the following measurements: long-offset single-well measurements (electromagnetic (EM), sonic/seismic, gravity); cross-well (EM and seismic); surface EM: Magnetotellurics (MT), Controlled-source EM (CSEM), Spontaneous Potential (SP), Multi-channel transient EM (MTEM); surface gravity; surface to borehole (EM and seismic); offset-walkaway-walkaround vertical seismic profiling (VSP); transient pressure and multi-well interference testing; electrokinetics: electro-seismic and seismo-electric; permanent monitoring (EM, pressure, seismic); and borehole radar and sonar.

9. The method of claim 7, wherein the set of deep reading measurements includes a combination of three of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

10. The method of claim 7, wherein the set of deep reading measurements includes a combination of four of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

11. The method of claim 7, wherein the set of deep reading measurements includes a combination of five of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

12. The method of claim 7, wherein the set of deep reading measurements includes a combination of six of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

13. The method of claim 7, wherein the set of deep reading measurements includes a combination of seven of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

14. The method of claim 7, wherein the set of deep reading measurements includes a combination of eight of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

15. The method of claim 7, wherein the set of deep reading measurements includes a combination of nine of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

16. The method of claim 7, wherein the set of deep reading measurements includes a combination of all ten of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

17. A non-transitory program storage device readable by a machine tangibly embodying a set of instructions executable by the machine to perform method steps for upscaling a reservoir model, the method steps comprising:

collecting a plurality of deep reading measurements of a reservoir, wherein the plurality of deep reading measurements comprises gravity and pressure measurements;

integrating together the plurality of deep reading measurements thereby generating a set of deep reading measurements, the set of deep reading measurements being sufficiently deep to be able to probe the reservoir;

generating a set of upscaled multi-well near-wellbore data;

constraining the set of the deep reading measurements using the upscaled multi-well near-wellbore data;

inverting, using a computer processor disposed on the machine, the set of deep reading measurements constrained by the upscaled multi-well near-wellbore data thereby generating an inverted set of deep reading measurements constrained by the upscaled multi-well near-wellbore data; and upscaling, using the inverted set of deep reading measurements constrained by the upscaled multi-well near-wellbore data.

18. The non-transitory program storage device of claim 17, wherein the set of deep reading measurements includes a combination of two or more of the following measurements: long-offset single-well measurements (electromagnetic (EM), sonic/seismic, gravity); cross-well (EM and seismic); surface EM: Magnetotellurics (MT), Controlled-source EM (CSEM), Spontaneous Potential (SP), Multi channel transient EM (MTEM); surface gravity; surface to borehole (EM and seismic); offset-walkaway-walkaround vertical seismic profiling (VSP); transient pressure and multi-well interference testing; electrokinetics: electro-seismic and seismo-electric; permanent monitoring (EM, pressure, seismic); and borehole radar and sonar.

19. The non-transitory program storage device of claim 17, wherein the set of deep reading measurements includes a combination of three of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

20. The non-transitory program storage device of claim 17, wherein the set of deep reading measurements includes a combination of four of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

21. The non-transitory program storage device of claim 17, wherein the set of deep reading measurements includes a combination of five of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

22. The non-transitory program storage device of claim 17, wherein the set of deep reading measurements includes a combination of six of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

23. The non-transitory program storage device of claim 17, wherein the set of deep reading measurements includes a combination of seven of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

24. The non-transitory program storage device of claim 17, wherein the set of deep reading measurements includes a combination of eight of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

25. The non-transitory program storage device of claim 17, wherein the set of deep reading measurements includes a combination of nine of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

26. The non-transitory program storage device of claim 17, wherein the set of deep reading measurements includes a combination of all ten of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

27. A method for upscaling a reservoir model, comprising:
collecting a plurality of deep reading measurements of a reservoir, wherein the plurality of deep reading measurements comprises gravity and pressure measurements;
integrating together the plurality of deep reading measurements thereby generating a set of deep reading measurements, the set of deep reading measurements being sufficiently deep to be able to probe the reservoir;
generating a set of upscaled multi-well near-wellbore data;
generating an initial model which includes a geostatistics step;
constraining the set of the deep reading measurements using the upscaled multi-well near-wellbore data and the initial model;
inverting, using a computer processor, the set of deep reading measurements constrained by the upscaled multi-well near-wellbore data and the initial model thereby generating an inverted set of deep reading measurements constrained by the upscaled multi-well near-wellbore data and the initial model; and
upscaling, using the inverted set of deep reading measurements constrained by the upscaled multi-well near-wellbore data and the initial model.

28. The method of claim 27, wherein the set of deep reading measurements includes a combination of two or more of the following measurements: long-offset single-well measurements (EM, sonic/seismic, gravity); cross-well (electromagnetic (EM) and seismic); surface EM: Magnetotellurics (MT), Controlled-source EM (CSEM), Spontaneous Potential (SP), Multi-channel transient EM (MTEM); surface gravity; surface to borehole (EM and seismic); offset-walkaway-walkaround vertical seismic profiling (VSP); transient pressure and multi-well interference testing; electrokinetics: electro-seismic and seismo-electric; permanent monitoring (EM, pressure, seismic); and borehole radar and sonar.

29. The method of claim 27, wherein the set of deep reading measurements includes a combination of three of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

30. The method of claim 27, wherein the set of deep reading measurements includes a combination of four of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

31. The method of claim 27, wherein the set of deep reading measurements includes a combination of five of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

32. The method of claim 27, wherein the set of deep reading measurements includes a combination of six of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

33. The method of claim 27, wherein the set of deep reading measurements includes a combination of seven of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

34. The method of claim 27, wherein the set of deep reading measurements includes a combination of eight of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

35. The method of claim 27, wherein the set of deep reading measurements includes a combination of nine of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

36. The method of claim 27, wherein the set of deep reading measurements includes a combination of all ten of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

37. A non-transitory program storage device readable by a machine tangibly embodying a set of instructions executable by the machine to perform method steps for upscaling a reservoir model, the method steps comprising:
collecting a plurality of deep reading measurements of a reservoir, wherein the plurality of deep reading measurements comprises gravity and pressure measurements;
integrating together the plurality of deep reading measurements thereby generating a set of deep reading measurements, the set of deep reading measurements being sufficiently deep to be able to probe the reservoir;
generating a set of upscaled multi-well near-wellbore data;
generating an initial model which includes a geostatistics step;
constraining the set of the deep reading measurements using the upscaled multi-well near-wellbore data and the initial model;
inverting the set of deep reading measurements constrained by the upscaled multi-well near-wellbore data and the initial model thereby generating an inverted set of deep reading measurements constrained by the upscaled multi-well near-wellbore data and the initial model; and
upscaling, upscaling the inverted set of deep reading measurements constrained by the upscaled multi-well near-wellbore data and the initial model.

38. The non-transitory program storage device of claim 37, wherein the set of deep reading measurements includes a combination of two or more of the following measurements: long-offset single-well measurements (electromagnetic (EM), sonic/seismic, gravity); cross-well (EM and seismic); surface EM: Magnetotellurics (MT), Controlled-source EM (CSEM), Spontaneous Potential (SP), Multi-channel transient EM (MTEM); surface gravity; surface to borehole (EM and seismic); offset-walkaway-walkaround vertical seismic profiling (VSP); transient pressure and multi-well interference testing; electrokinetics: electro-seismic and seismo-electric; permanent monitoring (EM, pressure, seismic); and borehole radar and sonar.

39. The non-transitory program storage device of claim 37, wherein the set of deep reading measurements includes a combination of three of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

40. The non-transitory program storage device of claim 37, wherein the set of deep reading measurements includes a combination of four of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

41. The non-transitory program storage device of claim 37, wherein the set of deep reading measurements includes a combination of five of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

42. The non-transitory program storage device of claim 37, wherein the set of deep reading measurements includes a combination of six of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

43. The non-transitory program storage device of claim 37, wherein the set of deep reading measurements includes a combination of seven of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

44. The non-transitory program storage device of claim 37, wherein the set of deep reading measurements includes a combination of eight of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

45. The non-transitory program storage device of claim 37, wherein the set of deep reading measurements includes a combination of nine of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

46. The non-transitory program storage device of claim 37, wherein the set of deep reading measurements includes a combination of all ten of the following measurements: (1) long-offset single-well measurements (electromagnetic (EM), sonic/seismic, gravity); (2) cross-well (EM and seismic); (3) surface EM: Magnetotellurics (MT), Controlled-source EM (CSEM), Spontaneous Potential (SP), Multi-channel transient EM (MTEM); (4) surface gravity; (5) surface to borehole (EM and seismic); (6) offset-walkaway-walkaround vertical seismic profiling (VSP); (7) transient pressure and multi-well interference testing; (8) electrokinetics: electro-seismic and seismo-electric; (9) permanent monitoring (EM, pressure, seismic); and (10) borehole radar and sonar.

47. A system adapted for upscaling a reservoir model, comprising:
a processor and a memory;
first apparatus adapted for collecting a plurality of deep reading measurements of a reservoir, wherein the plurality of deep reading measurements comprises gravity and pressure measurements;
second apparatus adapted for integrating together the plurality of deep reading measurements thereby generating a set of deep reading measurements, the set of deep reading measurements being sufficiently deep to be able to probe the reservoir;
third apparatus adapted for generating a set of upscaled multi-well near-wellbore data;
fourth apparatus responsive to the set of deep reading measurements from the second apparatus and to the set of upscaled multi-well near-wellbore data from the third apparatus for generating a set of the deep reading measurements constrained by the upscaled multi-well near-wellbore data;
fifth apparatus adapted for inverting the set of deep reading measurements constrained by the upscaled multi-well near-wellbore data thereby generating an inverted set of deep reading measurements constrained by the upscaled multi-well near-wellbore data; and
sixth apparatus adapted for upscaling the inverted set of deep reading measurements constrained by the upscaled multi-well near-wellbore data.

48. The system of claim 47, wherein the set of deep reading measurements comprises a combination of two or more of the following measurements: long-offset single-well measurements (electromagnetic (EM), sonic/seismic, gravity); cross-well (EM and seismic); surface EM: Magnetotellurics (MT), Controlled-source EM (CSEM), Spontaneous Potential (SP), Multi-channel transient EM (MTEM); surface gravity; surface to borehole (EM and seismic); offset-walkaway-walkaround vertical seismic profiling (VSP); transient pressure and multi-well interference testing; electrokinetics: electro-seismic and seismo-electric; permanent monitoring (EM, pressure, seismic); and borehole radar and sonar.

\* \* \* \* \*